US008751466B1

(12) United States Patent
Tsay

(10) Patent No.: US 8,751,466 B1
(45) Date of Patent: Jun. 10, 2014

(54) CUSTOMIZABLE ANSWER ENGINE IMPLEMENTED BY USER-DEFINED PLUG-INS

(71) Applicant: Machine Intelligence Services, Inc., San Marcos, CA (US)

(72) Inventor: Jeff Tsay, San Diego, CA (US)

(73) Assignee: Machine Intelligence Services, Inc., San Marcos, CA (US)

( * ) Notice: Subject to any disclaimer, the term of this patent is extended or adjusted under 35 U.S.C. 154(b) by 0 days.

(21) Appl. No.: 14/153,034

(22) Filed: Jan. 12, 2014

(51) Int. Cl.
*G06F 17/30* (2006.01)

(52) U.S. Cl.
USPC .......................................... 707/700

(58) Field of Classification Search
USPC ................................. 707/706, 707
See application file for complete search history.

(56) References Cited

U.S. PATENT DOCUMENTS

| | | | |
|---|---|---|---|
| 6,912,532 | B2 | 6/2005 | Andersen |
| 7,373,351 | B2 | 5/2008 | Wu et al. |
| 7,487,144 | B2 | 2/2009 | Shakib et al. |
| 7,693,956 | B2 | 4/2010 | Moricz et al. |
| 7,739,258 | B1 | 6/2010 | Halevy et al. |
| 7,747,626 | B2 | 6/2010 | Grimm et al. |
| 7,941,419 | B2 | 5/2011 | Bhatkar et al. |
| 2002/0069194 | A1 | 6/2002 | Robbins |
| 2003/0158835 | A1* | 8/2003 | Redpath ............................ 707/1 |
| 2005/0160083 | A1 | 7/2005 | Robinson |
| 2007/0136246 | A1* | 6/2007 | Stenchikova et al. ............. 707/3 |
| 2007/0136256 | A1* | 6/2007 | Kapur et al. ....................... 707/3 |
| 2007/0240031 | A1* | 10/2007 | Zhao ............................ 715/501.1 |
| 2009/0106223 | A1* | 4/2009 | Meyerzon et al. ................ 707/5 |
| 2009/0287678 | A1* | 11/2009 | Brown et al. ..................... 707/5 |
| 2009/0293687 | A1* | 12/2009 | Nino et al. ....................... 81/476 |
| 2010/0057686 | A1 | 3/2010 | Breiner et al. |
| 2012/0136887 | A1 | 5/2012 | Cha et al. |
| 2012/0240053 | A1* | 9/2012 | Shriber et al. ................ 715/749 |
| 2013/0031122 | A1* | 1/2013 | Riezler et al. ................. 707/760 |
| 2013/0268357 | A1* | 10/2013 | Heath ......................... 705/14.53 |
| 2013/0304758 | A1 | 11/2013 | Gruber et al. |

FOREIGN PATENT DOCUMENTS

EP      1158421      11/2001

OTHER PUBLICATIONS

"Ranking Suspected Answers to Natural Language Questions Using Predictive Annotation", by D. Radev, J. Prager, and V. Samn, 2000, 8 pages, May 2000.

* cited by examiner

*Primary Examiner* — Mahesh Dwivedi
(74) *Attorney, Agent, or Firm* — ARC IP Law, PC; Joseph J. Mayo

(57) ABSTRACT

Methods of computing answer results to user-submitted queries, using a plug-in executor, a user database, a plug-in database, content recognizers, answer generators and a controller. Controller submits content recognizer specifications and sets of answer generator specifications to the plug-in executor, combines content recognition results, combines answer generator answer results, determines the subset of answer generators to execute using an answer generator set determinator, looks up the specifications for each answer generator in the subset of answer generators, and responds to the client program with a list of answer results. Users customize how answer engines respond to queries, answers are generated by answer generator plug-ins created by other users, content recognizers are implemented by content recognizer plug-ins created by other users, and answer generators utilize content recognizers even if the content recognizers are not created by a single author and content recognition execution resources are bounded.

24 Claims, 12 Drawing Sheets

CUSTOMIZABLE ANSWER ENGINE IMPLEMENTED BY USER-DEFINED PLUG-INS

BACKGROUND OF THE INVENTION

1. Field of the Invention

One or more embodiments of the invention are related to the field of software processes that provide answers to queries. Specifically, embodiments of the invention relate to methods of computing answer results to user-submitted queries customizable by one or more users without requiring keywords to operate, using a plug-in executor, a user database, a plug-in database, a content recognizer, an answer generator and a controller. Users may customize how answer engines respond to queries, answers may be generated by answer generator plug-ins created by other users, content recognizers may be implemented by content recognizer plug-ins created by other users, and answer generators may utilize content recognizers even if the content recognizers are not created by the same author. Not all content recognizers need to be executed for every user, and plug-in resources execution resources are bounded.

2. Description of the Related Art

Generally, users often access the Internet in search for answers to specific questions, rather than general search results, such as links to documents that contain keywords.

Generally, many users begin the process of finding answers by visiting a general search engine, such as Google or Bing. Google and Bing may be considered hybrid answer engines as they both use content recognition and knowledge databases to aid the search process, while indexing is still their main strength.

Typically, most general search engines only index the surface web. However, the deep web is generally much larger than the surface web. Due the size and difficulty in automatically discovering content in the deep web, little, if any, deep web content is typically returned by general search engines. Therefore, if the answer to a user's question resides only in the deep web, a general search engine would not be able to supply the answer to the user.

Typical solutions that enable deep web content to be available in search engine results suffer from several key disadvantages. For example, U.S. Pat. No. 7,941,419 to Bhatkar et al., entitled "Suggested Content With Attribute Parameterization", discloses system-provided URL templates to determine the location of context to fetch before fetching and returning the content to a user. U.S. Pat. No. 7,739,258 to Halevy et al., entitled "Facilitating Searches Through Contest Which Is Accessible Through Web-Based Forms", discloses a system that facilitates crawling through web-based forms to gather information using reverse engineering forms. U.S. Pat. No. 7,693,956 to Moricz et al., entitled "Accessing Deep Web Information Using A Search Engine", discloses identifying and reconciling associated query parameters of queries of query answer web pages to a set of search criteria. Also, United States Patent Publication 20100057686 to Brenier et al., entitled "Deep Web Search", discloses a data processing system and method for researching websites according to a user query. The systems of Moricz et al. and Brenier et al., for example, use custom understanding of forms to build an index of deep web content. United States Patent Publication 20130304758, to Gruber, et al., entitled "Crowd Sourcing Information to Fulfill User Requests", discloses how to utilize user-contributed sources to answer queries.

Such typical solutions as discussed above require that the deep web content be accessible by the search engine. If the content is located on a private network accessible by the user, but not the search engine, a typical search engine will not be able to fetch or index the content. Even if the content is reachable, a search engine would typically fetch the content as a generic user, instead of as the user issuing the search request. In such a case, generally, the indexed content would not match what the user would see had he fetched the same location, and this may lead to omitting the location in the list of search results, even though the location would contain relevant information if fetched directly by the user.

Other typical solutions, such as United States Patent Publication 20050160083 to Robinson, entitled "User-Specific Vertical Search", discloses techniques for performing user-specific searches, wherein if the external site hosting the content is reachable through the network, but requires authentication for access, the content could be fetched on behalf of the user if the search engine stores and transmits the user's credentials with its requests to external services. However, due to security risks, users generally may not be willing to provide their credentials of other sites to the search engine.

Another disadvantage of typical solutions for searching the deep web is that the set of deep web services that is available cannot be customized by untrusted users, or if it is, customization requires integration into the search engine, testing, and manual approval before a new source of deep web services becomes available. DuckDuckGo Goodies, described below, may act as a source of deep web services, and are an example of a solution that allows customization by users, using Goodies, but Goodies must be approved before becoming available. The requirement for the manual approval generally originates from the fact that executing untrusted code carries serious security implications, with both the execution itself and the content that may be generated.

In addition, known systems for searching the deep web have difficulty indexing practically infinite amount of data that may be in one of a huge variety of formats. Considering a web form that takes as input a UPC-A code, for example, there are typically ten digits in a UPC-A code between a numbering system digit and a check digit, therefore there are about 10^10 or 10 billion UPC-A codes in a given numbering system. Very few of the pages may be pruned from the index, because generally UPC-A codes are looked up more or less randomly. Indexing the entire set of pages returned by the form, such as a single form among the millions on the Internet, would normally require 10 billion entries. To overcome this disadvantage, search engines like Google appear to perform content recognition on search queries, wherein for example, Google recognizes twelve digit codes as UPC-A codes, and information about the associated product is returned at the top of the result page. Alternatively, the set of known UPC-A codes may be indexed, which is much smaller than all the possible UPC-A codes. While these approaches are effective, users generally cannot customize the content recognition algorithm, limiting its usefulness. For example, a product manager who uses an issue tracking web application typically does not have the ability to customize Google to recognize an eight-digit number as an issue number for the manager's issue tracking application. As a result, Google is generally unable return a link to the issue tracking web application in its search results, when an eight-digit number is entered as a search query. Also, typically, each query needs to be checked for several, if not all, known content formats since there is no way for a user to customize his account to only recognize certain formats, in order to decrease his query response time or to disambiguate formats that match the same text. The more format types that may be recognized, the more computing resources are consumed and, past a certain degree of parallelism, generally the longer the query will take to process. Other previously mentioned systems, such as United States Patent Publication 20130304758, to Gruber, that do not allow for user implemented content recognizers, also suffer from the same disadvantages.

Instead of general search engines, users may consult answer engines, which perform computation to answer queries. A popular answer engine most often used for technical queries, for example, is Wolfram Alpha. Wolfram Alpha generally uses a computation engine and a knowledge database to provide answers to queries like "sin(pi/2)*3" or "atomic mass of carbon". One limitation of this typical approach is that answer queries that involve computation need to be crafted in a single language, such as Mathematica. Furthermore, another limitation of such a typical approach is that the answers are generally provided only by Wolfram Alpha itself; hence users typically cannot direct the website to compute arbitrary functions, include answers from other websites, or inject knowledge into its database. An example of a website that does allow user contributions is Freebase, which exposes a database of human knowledge. Freebase, generally, relies on the community to provide knowledge, but it only contains about 2 billion facts as of 2013, while the number of useful facts is likely to be orders of magnitude larger.

Typically, there are many questions asked by real users that have answers that may be easily computed, but not by Freebase or any other knowledge engine, for example. Furthermore, Freebase generally stores only data, but not algorithms to compute answers. Therefore, typical knowledge engines generally cannot, for example, respond meaningfully to a query such as, "What is the 5 day moving average of the stock price of IBM?", if the answer has not been pre-computed and stored already.

DuckDuckGo, for example, is an answer engine that typically allows users to upload plug-ins called Goodies that generate answers, either in the form of an inline answer (the content of the answer) or a link to a page that contains the answer. These plug-ins, generally, are written in Perl, a relatively insecure programming language, and must generally be approved by the management of DuckDuckGo before going live. Most likely, a reason for the approval step is required because executing untrusted code is a performance risk and a security risk. Once approved, the content in an inline answer produced by a plug-in, typically, is inserted directly into answer pages. In the DuckDuckGo answer engine, generally, all plug-ins are executed, regardless of the identity of the user. If a malicious plug-in is inadvertently approved, for example, the DuckDuckGo answer engine may be attacked, or an answer page may be injected with script that steals cookies or otherwise compromises any user's security.

Using the DuckDuckGo answer engine, generally, Goodies must individually implement content recognition in order to generate different results for the same type of content. For example, if one Goodie outputs the estimated house price at an address, and another Goodie outputs the property tax information for an address, both Goodies typically need to implement address recognition, and both recognition algorithms need to execute. Due to DuckDuckGo's lack of user accounts, generally, users cannot select which Goodies to run, as all Goodies are always running. The number of recognition routines that need to be executed typically increases linearly with the number of Goodies, which may not scale indefinitely.

In "Ranking Suspected Answers to Natural Language Questions Using Predictive Annotation", by D. Radev, J. Prager, and V Samn, an answer service, called GuruQA, is developed to use indexed documents to answer questions. GuruQA, uses a pre-defined set of content recognizers to mark answer query terms as belonging to a few categories. Since documents need to be reachable to be indexed, GuruQA suffers from the inability to access the deep web. Even if the entire web could be indexed, for example, GuruQA cannot perform computations like "square root of 5.33" since it relies on the answer being in a document. As stated by the authors, GuruQA also generally does not handle "how" and "why" questions very well, as it needs to use artificial intelligence to understand the documents it indexes. Finally, it is not possible in GuruQA for users to define content recognizers or strategies to answer questions.

Other typical search engines, such as vertical search engines, may also provide answers. Given that a segment is known, a vertical search engine is likely to return more relevant answers than general search engines due to its use of domain specific knowledge and focused crawling of sites known to be relevant to the segment. However, vertical search engines are usually not appropriate to use as starting points to determine any kind of answer. Generally, the vertical search engine needs to be selected a priori by the user. Furthermore, most vertical search engines use indexing web crawlers, wherein like general search engines, they are also unable to return many results from the deep web. United States Patent Publication 20050160083 to Robinson appears to show how a vertical search engine could retrieve personalized results from the deep web. However, such a system generally requires that: (1) the search engine has access to the content, which could be in a private network, but still be available to the user; and (2) the user is willing to share with the search engine his credentials to access other external services, which may be a security risk.

Meta-search engines, typically, may increase the breadth of general search engines, save the user from searching multiple sites, and allow the possibility of user customization of the choice and implementation of the search engines that are consulted. Typically, meta-search engines combine results from other general search engines. For example, DogPile combines results from Google, Yahoo!, and Yandex. Meta-search engines like DogPile generally suffer from the same disadvantage as general search engines, which is the difficulty of returning results from the deep web. Typical solutions such as European Patent 1158421 to Bae et al., and U.S. Pat. No. 7,487,144 to Shakib et al., allow for greater customization, however generally do not simplify the manner of returning results from the deep web. The system of Bae et al., for example, discloses wherein each search engine is typically only activated when triggered by keywords, therefore the user has no other control over the activation or priority of the vertical search engines. But, generally, a search query might not have any keywords, like a number.

If a user submits search queries by selecting text, the selected text is unlikely to contain the keywords needed to activate the vertical search engine. Also, a user may want to ensure a particular search engine's results are favored over those of another, such that that it takes less time for the user to find the first search engine's results in the list of search results. In the system of Shakib et al., for example, a user may select a vertical search engine in his preferences, which positively influences the possibility of the vertical search engine being used to service the user's query. However, the logic for selecting a vertical search engine and ordering its results is made by a "vertical determinator", which is generally not customizable by the user. As such, queries without keywords associated with a given vertical search engine, usually, are unlikely to activate the vertical search engine. U.S. Pat. No. 7,373,351 to Wu et al., entitled "Generic Search Engine Framework", discloses a knowledge database used to determine which search engines are selected. However the system of Wu et al. suffers from the same disadvantages discussed above.

Typical answer engines, knowledge engines, vertical search engines, and meta-search engines are usually not optimal for finding answers. Many users looking for answers, typically, use a general search engine to find the right website (s) to look for answers, then enter their query in the discovered website(s). For example, a user looking up the English definition of a word in Chinese might search for "Chinese English dictionary" on google.com, which would return a list of sites, such as http://www.zhongwen.com. Typically, the user would then select the link to http://www.zhongwen.com, and finally enter the word to look up. If the user visits Zhong-Wen.com frequently, the user may generally bookmark the site, or remember the site address, but the next time the user wants to look up a word, the user would typically have to either find the bookmark, or recall the site address and enter it in a browser. If there are multiple websites that the user wants to use to look up the word, for example, the user generally must find each site and enter the word on every website. This process quickly becomes tedious, especially when looking up several words.

Some existing solutions for removing the need to enter queries on multiple web sites rely on the assumptions that (1) the best answer pages available on the web are most likely to be the result of submitting forms on websites built for a specialized purpose, and (2) submitting such a form frequently results in a HTTP GET request of a URL that contains the search query, possibly after a transformation like URL encoding. As such, answer URLs are typically generated by taking a URL template and substituting parts of the search query into the URL template. URL templates are generally used in products like Search Center and Selection Search; both Google Chrome extensions. The output URLs are then typically either loaded into a browser directly or compiled in a result page. While using such typical solutions, typically, (1) the URLs are built on the client side, therefore the set of sites that may be searched may only be upgraded by the user updating the browser plug-in or by defining the URL template directly; (2) knowledge on the effectiveness of URL templates for all users is not accumulated, therefore the user may not know which URL templates to select; (3) the user must specify which sites or categories to use before submitting a query, otherwise many irrelevant answers will be returned; (4) a custom browser or browser plug-in needs to be downloaded and installed; and (5) inline answers are not supported, such as the answer to "second prime number" being "3".

United States Patent Publication 20020069194 to Robbins, entitled "Client Based Online Content Meta Search", appears to disclose how to download URL templates from a server, and execute them on the client. Once the URL is formed and downloaded, the client can parse the contents to extract the relevant information, and present it in the search results. Since the URL templates are stored on the server side, knowledge of the availability and effectiveness of URL templates from multiple users can be accumulated on the server. However, the system of Robbins appears to require that the user specify which sites or categories to use before submitting a query, or else too many sites will be accessed and too many results will be returned, and a custom browser or browser plug-in needs to be downloaded and installed. Also, extracting and presenting information found by downloading URLs may be computationally expensive, use network resources unnecessarily, or violate the hosting site's terms of service.

United States Patent Publication 20120136887 to Cha et al., entitled "Method and System for Providing Multifunctional Search Window Service Based On User-Generated Rules", appears to disclose utilizing user created rules for creating URL templates, and allowing users to customize the search results by selecting and prioritizing such rules. However, the system of Cha et al. appears to disclose wherein the rules are triggered by keywords, and if keywords are not present, the default rules, which may be too general for some search queries, may output too many irrelevant answers.

U.S. Pat. No. 7,941,419, to Bhatkar et al., appears to utilize URL templates in a server-side solution, but fetches the content from the URL before returning it to the user. As such, the system of Bhatkar et al., typically, is unable to return results that are not available on the server-side, even if they are available on the client-side. Also, the system of Bhatkar et al., generally relies on "triggering words" to be present in a query to determine which URL templates to use.

Search result pages returned by general search engines typically contain a list of results, each having a link to another site. The user typically needs to manually click each link to view the search result, which either: (1) opens the link in the same tab or (2) opens the link in another browser tab. In the case of option (1), the user typically needs to go back to the search results page to view the other results. In the case of option (2), the new browser tab must typically be closed manually even if the user initiates another search.

Another type of user interface for viewing search results allows users to switch tabs within the same page, with each answer page in an iframe activated by a tab. An example of such a typical search engine is discussed in U.S. Pat. No. 6,912,532 to Andersen, entitled "Multi-Level Multiplexer System for Networked Browser". In using the system of Andersen, with current websites, each iframe may not be displayed at all because many websites now send an X-Frame-Options header in their HTTP responses which prevents their content from being displayed in iframes in order to prevent click-jacking attacks.

If the user is using an effective answer engine, typically, the results are more likely to be what the user is seeking, as such alternative user interfaces for presenting search results may be more appropriate. Generally, only presenting links on a single page may be the result of search engines typically earning revenue when such links are manually clicked. Client-side solutions such as Search Center, Selection Search, and as discussed in United States Patent Publication 20020069194 to Robbins, generally have the advantage that with a custom browser or browser plug-in installed, the process of searching for answers may be streamlined. With tools like Selection Search, search queries may typically be selected on existing web pages instead of entered manually into an input box. Search Center, Selection Search, and other similar plug-ins are typically purely client-side solutions; therefore users do not get the benefit of search plug-ins created by other users.

Another typical solution for the search user interface is described in U.S. Pat. No. 7,747,626 to Grimm et al., entitled "Search Results Clustering in Tabbed Browsers", wherein search results are opened in another browser window's tabs, therefore the user may see answer pages instantly, without having to scan a result page and click links. However, the system of Grimm et al. typically loads all answer pages immediately after the search engine returns the search result. As such, if there are many search results, the browser may be asked to execute tens or even hundreds of web requests at the same time, and each web page could in turn loads dozens of external images, CSS files, and JavaScript files. The concurrent requests typically slow the loading of the first result page unnecessarily, since the user does not see the other result pages until after he clicks the other browser tabs. Additionally, the concurrent requests may over utilize the capacity of the client, which may be a mobile device connected to the network with a low bandwidth connection. Further, the system of Grimm et al. generally does not include a mechanism of learning from user activity about which results are better than others. Generally, prior art user interfaces for displaying web search results in browser tabs do not handle the possibility of results containing inline answers, as opposed to answer locations.

In summary, the answer engine systems described above lack one or more of the following capabilities that enable answer engine users the capability to customize the operation of an answer engine, enable an answer engine to be implemented by a developer community instead of a monolithic entity, enable an answer generation process to occur without keywords or a pre-defined grammar, enable content providers to leverage content recognition capabilities in other plug-ins, enable the reduction of computation required for content recognition based on the user's preferences, enable new answer generation methods to come online and change the behavior of the answer engine without server restarts, manual approval, or significant security risks, enable returning results from the deep web, including results in private networks and results generated with knowledge of the user's identity, and allow content providers to control when users are directed to their sites. Furthermore, the user interfaces to display answers lack one or more of the following capabilities that enable users to view multiple search results without leaving the currently viewed window by selecting or inputting text, enable users to view multiple search results without loading each search result immediately, streamline the process for users to search for multiple items in a succession, and rank plug-ins and their generated answer results based on user interaction with a browser. For at least the limitations discussed above, there is a need for methods of computing and presenting answer results to user-submitted queries.

BRIEF SUMMARY OF THE INVENTION

One or more embodiments described in the specification are related to systems and methods of computing answer results to user-submitted queries. In at least one embodiment of the invention, a method includes providing a plug-in executor comprising at least one plug-in created by a user, providing a user database that may store and retrieve user preferences, and providing a plug-in database that may store and retrieve plug-in specifications. In one or more embodiments, the plug-in executor may execute one or more of system-defined programs and user-defined programs, and the plug-in executor may execute one of more of arbitrary program text or binaries uploaded by a plug-in developer and execute routines parameterized by the plug-in developer. In at least one embodiment, the user may include a single user or a plurality of users. Furthermore, in at least one embodiment, the plug-in developer may include a single plug-in developer or a plurality of plug-in developers. The single plug-in developer may be the same user submitting the query, or if there is a plurality of plug-in developers, the plurality may include the same user.

By way of one or more embodiments, the method may provide a content recognizer set determinator that may compute a subset of all available content recognizers, provide an answer generator set determinator that may compute a subset of all available answer generators, and provide a controller. In at least one embodiment, the computing of the subset by the content recognizer set determinator may depend on one or more of contents of a query and one or more queries previously submitted by the user. In addition, the computing of the subset by the answer generator set determinator may depend on one or more of contents of the one or more queries submitted by the user and a dictionary of combined recognition results used as an input.

In one or more embodiments of the invention, the controller may receive one or more queries from a client program, lookup the user's preferences in the user database, determine the subset of content recognizers to execute using the content recognizer set determinator, and lookup specifications for each content recognizer in the subset of content recognizers. Furthermore, in at least one embodiment, the controller may submit the specifications for each content recognizer to the plug-in executor, using the query and the user's preferences as input, combine all content recognition results into a dictionary of combined content recognition results, determine the subset of answer generators to execute using the answer generator set determinator, and lookup the specifications for each answer generator in the subset of answer generators, to yield a set of answer generator specifications.

In at least one embodiment, the controller may submit the set of answer generators specifications to the plug-in executor, using the user's preferences and the dictionary of recognition results as input, combine the answer results from each answer generator into a list of answer results, and respond to the client program with the list of answer results. As such, in one or more embodiments, the user may customize how an answer engine responds to queries, answers may be generated by at least one answer generator plug-in created by one or more plug-in developers, content recognizers may be implemented by at least one content recognizer plug-in created by one or more plug-in developers, and answer generators may utilize content recognizers even if the content recognizers may not be created by a single author and content recognition execution resources may be bounded.

By way of at least one embodiment, the content recognizer set determinator may look up a list of trigger-answer generator associations selected by the user initiating the query in the user database and may build the set of content recognizers by combining all referenced content recognizers referenced by a trigger in a list of triggers-answer generator associations. Furthermore, in one or more embodiments, the content recognizer set determinator may look up a list of answer generators selected by the user initiating the query in the user database, and may build the set of content recognizers by combining all content recognizers referenced by an answer generator in the list of answer generators.

In at least one embodiment of the invention, the method may provide an index of recognition keys, mapped to content recognizers, that may lookup content recognizers that output a given recognition key. In one or more embodiments, the content recognizer set determinator may look up a list of answer generators selected by the user initiating the query in the user database, build a set of recognition keys by combining all recognition keys referenced by the answer generator in the list of answer generators, into a set, build the set of content recognizers by looking up each recognition key in the set of recognition keys in the index of recognition keys mapped to content recognizers, and combine one or more found content recognizers into a set.

By way of one or more embodiments of the invention, the answer generator set determinator may look up a list of trigger-answer generator associations selected by the user initiating the query in the user database, and look up trigger specification, in the plug-in database, for each trigger referenced by the list of trigger-answer generator associations, to yield a set of trigger specifications. Further, in one or more embodiments, the answer generator set determinator may submit the set of trigger specifications to the plug-in executor, using the dictionary of combined recognition results as input, to determine which triggers are activated, and may build the set of answer generators to activate by selecting one or more answer generators in the list of trigger-answer generator associations, that have their associated triggers activated.

In at least one embodiment, the plug-in executor may execute programs in a sandboxed environment in order to limit computation resources, memory, system resource access, or network access utilized by the programs. As such, in embodiments of the invention, the plug-in created by the user, the answer generator plug-in created by other users and the content recognizer plug-in created by other users may be made available immediately after creation and are safe to execute. In addition, the plug-in executor may monitor the computation resources, the memory, and bandwidth used by one or more of the at least one plug-in created by the user, the at least one answer generator plug-in created by other users and the content recognizer plug-in created by other users. In at least one embodiment, the plug-in executor would execute scripts in a Javascript interpreter, such as Mozilla Rhino, running in interpretation mode, monitoring the execution time, call stack, and memory usage of the interpreter, and running with a Java VM security manager that blocks access to sensitive resources. In at least one embodiment, the bandwidth comprises upload bandwidth and download bandwidth. In one or more embodiments, the plug-in executor may adjust a score for an executed plug-in by penalizing for the computation resources, the memory, the upload bandwidth, and the download bandwidth used by the executed plug-in.

By way of at least one embodiment, the answer engine may use a report by adjusting the score of the plug-in created by the user, the answer generator plug-in created by other users and the content recognizer plug-in created by other users, by a value dependent on both a type of user interface activity and a relevance score reported by the plug-in, the answer generator plug-in and the content recognizer plug-in. In one or more embodiments, the user interface activity may be used to better order and rank one or more plug-ins, wherein answer results and one or more plug-ins may trade-off between accuracy, wherein the answer results, ordered by the scores of the plug-ins that were involved in their generation, may be shown to the user or the other users more prominently. In at least one embodiment, the answer engine may weigh a reward of the score and may weigh a penalty of the score by the reported relevance score. The reward of the score, in embodiments of the invention, may include an answer result resulting in the user following a link produced by the answer generator, and the penalty score may include an answer result reported by the user or the other users as being unhelpful.

In one or more embodiments, the controller may sanitize the list of answer results such that the content in the list of answers, when inserted into a user interface, may not be able to perform malicious operations, wherein the malicious operations include sending private information to one or more external sites.

In at least one embodiment of the invention, the method may include providing a user and system populated index from keywords to specifications for recognition results, wherein the controller may search the index from keywords to specifications for recognition results, using the query as input, in order to produce additional recognition results by processing the specifications for recognition results. In one or more embodiments, the method may include providing a knowledge base of facts that may look up facts for a given query term, wherein the controller may search the knowledge base using the query term as input, to produce additional recognition results.

By way of one or more embodiments, the method may provide a term/recognition key index that may look up and store answer generator references associated with terms and keywords. As such, in at least one embodiment, the answer generator set determinator may transform terms in an answer query by one or more of correcting spelling mistakes, adding synonyms, adding translations, stemming words, removing stop words, expanding acronyms, or any combination thereof, and lookup in the term/recognition key index, using the transformed terms and the recognition keys, output by the set of content recognizers as the input, to yield a partial set of answer generators included in the final set of answer generators output by the answer generator set determinator.

In at least one embodiment, the plug-in created by a plug-in developer may provide documentation on how to use the plug-in, given a partial query. Furthermore, in at least one embodiment, using the plug-in created by a plug-in developer, the user may be shown instructions on how to use the plug-in, while typing an answer query.

In one or more embodiments of the invention, a method of displaying a list of answer results in response to user-submitted queries may include providing an answer engine that may respond to user-submitted queries with a list of answer results and providing an answer displayer with a browser plug-in, a customized browser, an application, or any combination thereof. In at least one embodiment, the answer display may receive an answer query as input from a user, send the answer query to the answer engine, receive and parse answer results returned by the answer engine, and find an existing display area or open a new display area in a user interface to display the answer results. In one or more embodiments, the answer display may remove one or more user interface elements showing an answer result from a previous query, in the display area, unless the removal of the user interface elements would cause the display area to be closed by the answer displayer, or unless the user has indicated to keep the user interface elements. In at least one embodiment, the answer display may o compute a first group of answer results by selecting one link answer result, or inline answer results from the answer results, display the first group of answer results in the display area and compute the remaining groups of answer results by selecting one link answer result, or inline answer results from the answer results, until no more ungrouped answer results remain. In one or more embodiments, the answer display may display in the display area one or more remaining groups from the remaining groups by directly displaying answer results if the remaining groups include only inline answer results, or by displaying a button if the remaining groups include a link answer result, such that a linked answer location is loaded and displayed when the user selects the button.

By way of one or more embodiments, the user may show answer results without manually opening or closing display areas and removing user interface elements showing results of previous queries, the user may receive a plurality of results from different sources without submitting a same query to multiple user interfaces, links to answer locations may not be fetched until the user selects the links, and the user may view inline answer results without additional user interaction.

In at least one embodiment of the invention, the answer displayer may detect when the user selects, closes, or rearranges each user interface element of the user interface elements representing the answer results, and may send a report of user interface activity to the answer engine.

GLOSSARY OF TERMS AND DEFINITIONS

API: Application Programming Interface

Answer Engine: A service that may provide answers to questions.

User: A person, or group of people, that may utilize the answer engine. When the term "user" is used herein, such as in "user-created" or "user-specified", the term is used to refer to answer engine consumers, including individuals such as laypersons and "uber-users", to differentiate such users from answer engine providers such as software professionals and groups that design and build the answer engine from bottom-up. A "user" is an individual that navigates to a website, application, or other query-input location.

Plug-in developer: A user that also contributes one or more plug-ins, or uploads to one or more indexes, for use by the answer engine. Such a user is usually not affiliated with the providers of the answer engine.

Answer: Either a location pointing to the information the user is looking for (an answer location which points to an answer page), or the content of the information itself (an inline answer).

Knowledge Database: A database that may contain facts.

Knowledge Engine: An answer engine that may use a knowledge database.

Search Engine: A service that may return results that may have matching keywords in the search query.

Web Crawler: A program that may explore websites, in order to put documents into an index used for searching.

Indexing Search Engine: A search engine that may use web crawling to index documents.

General Search Engine: An indexing search engine that may return results for all segments, for example in a non-specialized manner.

Vertical Search Engine: A search engine that may return results in a specific segment, for example a sports segment, a news segment, etc.

Meta-Search Engine: A search engine that may use multiple external search engines or data sources and combine their results.

Hybrid Answer Engine: An answer engine that may use multiple techniques for generating answers.

URL Template: A template that may generate URLs, by substituting and processing parameters.

Content Recognition: Classification of text or other data, e.g. "92069" is a zip code.

Deep Web: A subset of all available web content in existence that may include content that may not be reachable by web crawling. Deep web may include pages dynamically generated in response to form submissions and content that may be contained inside private networks, such as company intranets.

Surface Web: A subset of all available web content in existence that only includes content reachable by web crawling the public Internet.

Recognition Result: A key-value pair that may indicate that one or more parts of an answer query was recognized as a type of content. The key, "recognition key", may be an indicator of what type of content (number, stock symbol, etc.) and is typically a string of text. A value may be a dictionary that may contain: 1) a recognition confidence score; 2) the matched text in the search query; and 3) other extracted or looked up information about the content that was recognized, for example the zip code of a full address, or the company name corresponding to a stock symbol, etc.

Term/Recognition Key Dictionary: A dictionary mapping each term in the answer query, to a list of pairs. Each pair in a list may consist of: 1) either a literal term or a recognition key; and 2) a weight.

Answer Location: A reference (such as a URL) to an external provider of content supplying an answer. An answer location may not be reachable by all users or by the answer engine itself. An answer location may refer to content within a user's intranet. An answer location may also refer to websites that the user has access to as a subscribed member, for example a website serving academic journals that requires a paid subscription to access.

Answer Result: A data structure that may contain either: an answer location that can be fetched and its contents displayed by a user program; or a snippet of content, such as web content (HTML), that may be directly displayed by a user program. An answer result may also contain: 1) a relevance score; 2) one or more icon locations; 3) a title; 4) additional text describing the answer location, or excerpted from the contents pointed to by the answer location.

Link Answer Result: An answer result that may contain an answer location.

Inline Answer Result: An answer result that may contain a snippet of content.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

Figure 1:
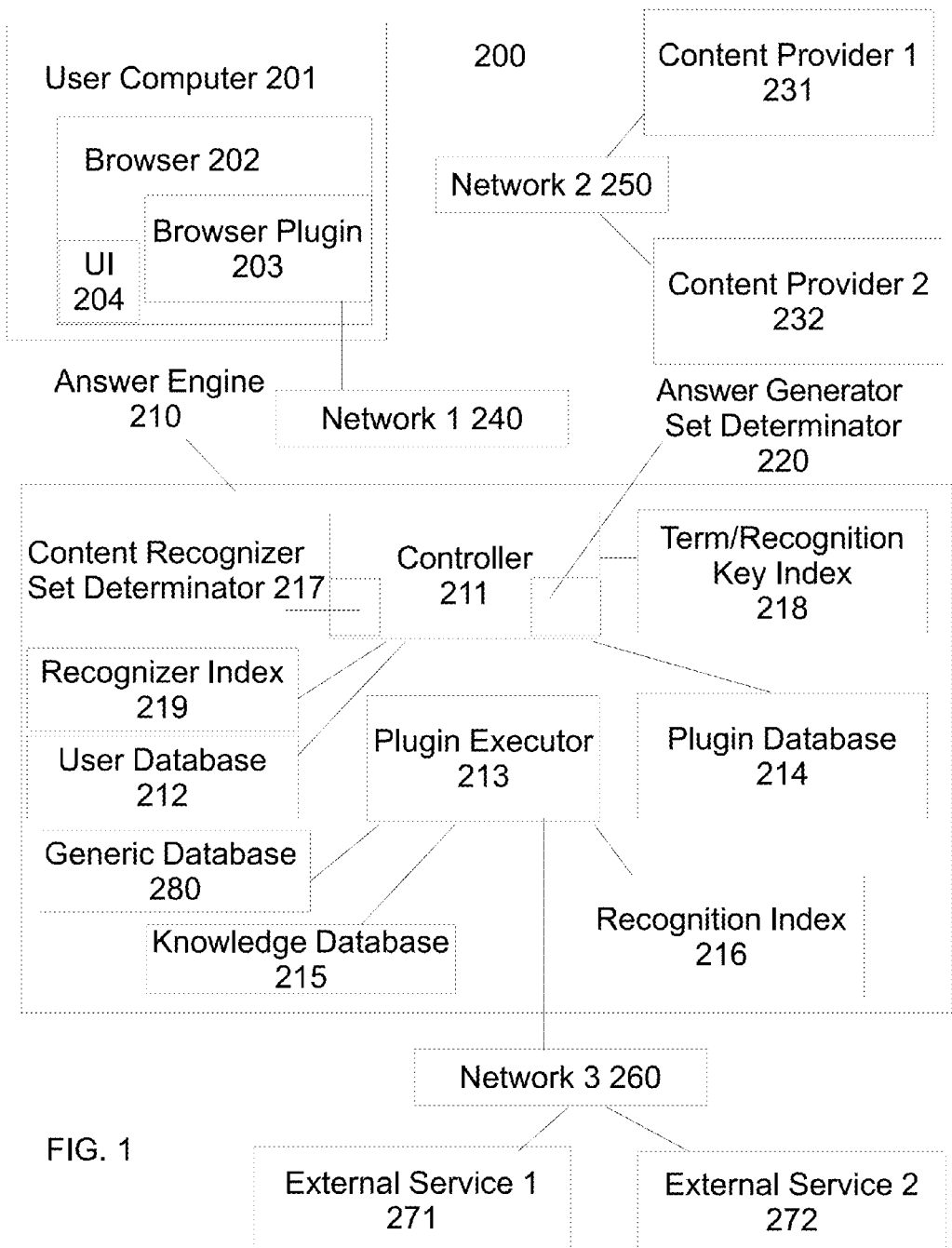
FIG. 1 illustrates a block diagram illustrating a data processing system for computing answers to queries provided by users by executing user-created plug-ins, according to one or more embodiments of the invention.

Systems and methods for computing and presenting answers from user-created plug-ins in response to query text expressing user questions will now be described. In the following exemplary description numerous specific details are set forth in order to provide a more thorough understanding of embodiments of the invention. It will be apparent, however, to an artisan of ordinary skill that the embodiments of the invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Initialization, Setup and Answer Engine Description

In one or more embodiments of the invention, a user may create user plug-ins or use plug-ins developed by other users. For example, the plug-ins may include content recognizers, triggers, answer generators, and answer post-processors. In at least one embodiment, content recognizers may take a raw search query as input and output a list of recognition results. In embodiments of the invention, the list of recognition results may be empty. Content recognizers, at least one embodiment, may also output additional terms to be used to look up a term/recognition key index, as will be discussed below.

In at least one embodiment, a content recognizer may be implemented by 1) matching queries with a user-supplied regular expression using a regular expression engine designed to withstand regular expression denial of service (ReDoS) attacks, and outputting the matched groups in the recognition result; 2) searching a knowledge database (such as knowledge database 215 discussed below in FIG. 1) for the terms in the query; 3) searching a recognition index (such as recognition index 216 discussed below in FIG. 1) for mappings of keywords in the query to recognition results; or 4) executing a software routine created either by a user or the answer engine provider.

Execution of regular expressions with an nondeterministic finite automaton (NFA) engine must be performed carefully because a malicious plug-in developer could potentially specify a regular expression that can take exponential time to execute because of backtracking. To prevent this, an NFA may be modified either to check periodically for the time elapsed or interruption by another entity, or a limit may be placed on the number of times backtracking is attempted before reporting a negative match.

By way of one or more embodiments of the invention, the system and method may include a trigger plug-in. Triggers may include metadata that specifies zero or more content recognizers to execute, either by directly referencing content recognizers or by specifying recognition keys which are further mapped to content recognizers in recognizer index 219, discussed below in FIG. 1). When executed, in embodiments of the invention, triggers may take the answer query and combined results of content recognition as input and output a Boolean value indicating whether or not to activate. In one or more embodiments, triggers may output a numerical value instead of a Boolean value, indicating the desirability of the activation. Additional logic may group the trigger results by answer generator and then determine whether or not to activate each answer generator, based on the numerical values produced by each trigger, according to embodiments of the invention. In at least one embodiment, a trigger may be implemented by: 1) ensuring the recognition results contain a recognition key mapped to a result that has a recognition level greater than or equal to a user-specified recognition level; 2) ensuring the recognition results contain a recognition key mapped to a result that has one or more desired attributes; or 3) executing a software routine created either by a user or the answer engine provider.

By way of one or more embodiments of the invention, the system and method may include an answer generator subset determinator plug-in. Answer generator subset determinators may include metadata that specifies zero or more content recognizers to execute, either by directly referencing content recognizers or by specifying recognition keys which are further mapped to content recognizers in recognizer index 219, discussed below in FIG. 1). When executed, in embodiments of the invention, answer generator subset determinators may take the answer query and combined results of content recognition as input and output a set of answer generators to be executed. In at least one embodiment, an answer generator subset determinator may be implemented by 1) executing a list of rules that specify conditions, which if true, indicate one or more answer generators to select or remove; or 2) executing a software routine created either by a user or the answer engine provider.

In one or more embodiments of the invention, answer generators may take combined recognition results, as will be discussed below, as input, and output lists of answer results. In at least one embodiment, answer generators may include metadata that specifies zero or more content recognizers to execute. In other embodiments, answer generators may include metadata that specifies zero or more content recognition keys that are desirable or required to have in the combined recognition results, such that the answer generator may output a meaningful answer result.

According to at least one embodiment, an answer generator may be implemented by 1) a URL template that may generate a link answer result; 2) a content template that may generate an inline answer; or 3) executing a software routine created either by a user or the answer engine provider. If an answer generator generates an inline answer, in embodiments of the invention, the content may be sanitized by the answer engine on the server side to ensure that it may safely be included in a user's interface. For example, web content may be sanitized by removing all JavaScript code and CSS that may alter the style of a container of the content. The answer engine, in embodiments of the invention, may use software libraries, such as JSoup and OWASP Java HTML Sanitizer, to perform the sanitization on the server side. Alternatively, the content may be sanitized on the client side by injecting into a page with a JavaScript sandbox, such as Google Caja, to allow some limited script execution but still ensure that no malicious code is executed, such as code that steals HTTP cookies or communicates with unauthorized servers.

In one or more embodiments, an answer generator may be marked as trusted by the answer engine service or by the user, such that produced content is not sanitized, leading to better performance and more capabilities for the content. Alternatively, an untrusted answer generator may be marked as ready for server-side sanitization, such that the untrusted answer may be sanitized by the answer engine only on the server-side, but not the client-side, which may typically be slower.

In at least one embodiment, answer post-processors may take, as input, the answer results output by a previous answer post-processor, or if the answer post-processor is the first in the chain, all answer results produced by all answer generators. Answer post-processors, in one or more embodiments, may output a resultant list of answer results based on removing, modifying, and/or re-ordering of the input answer results, or inserting new answer results. Answer Post-Processors may also combine information in different results and execute further searches. In one or more embodiments, an answer post-processor may be implemented by either: 1) a filter that orders answers with locations according to a priority list of domain names and removes results matching user-specified criteria; or 2) executing a software routine created either by a user or the answer engine provider.

According to at least one embodiment, plug-ins may have the following properties: 1) a name that identifies the plug-in; 2) descriptions or other text about the plug-in; 3) icons for or screenshots of the plug-in; 4) lists of users or user groups that have access to the plug-in; 5) a content template, such as a web form template, that allows the user to control settings for the plug-in; 6) a list of permissions, such as access to the user's email address, that are required for the plug-in to execute properly; and 7) a list of permissions that are desired, not mandatory, for the plug-in to execute. Each property may be localized, so a plug-in property may have different values in different locales.

In one or more embodiments, if a plug-in contains a content template that allows the user to control settings for the plug-in, when the user decides to edit settings for the plug-in, the answer engine may execute the content template, making available the user's current settings, if any, to the template. In at least one embodiment of the invention, execution of the content template is performed by the plug-in executor, which ensures that execution is secure. The answer engine, in one or more embodiments, may sanitize the content produced by the template to ensure it is safe to display in the client (for example ensuring it does not include malicious code, etc.) and ensure that the setting change request is submitted back to the answer engine. In at least one embodiment, the answer engine may use software libraries, such as JSoup and OWASP Java HTML Sanitizer, to perform the sanitization. When the user submits the settings form, the answer engine may parse the change request, according to one or more embodiments, such as a web form post request, and store the parsed settings in the user's configuration for the plug-in.

In at least one embodiment including trigger plug-ins, users may configure their search preferences by selecting and ordering one or more trigger-answer generator associations, which indicate that a particular answer generator may execute when a particular trigger is activated. Trigger-answer generator associations may be created, modified, and deleted by plug-in developers and are shared among multiple users, in one or more embodiments.

By way of one or more embodiments, a user may configure their search preferences by adding one or more answer generator configurations. An answer generator configuration, for example, may represent execution settings for a particular answer generator and for a particular user. In at least one embodiment, the answer generator configurations may include any of the following: 1) an activation code that, if present in the answer query, forces the associated answer generator to be executed; 2) settings used by the system-defined or user-defined implementation of the associated answer generator; and 3) permissions given to the associated answer generator, such as allowing access to the user's personal information and allowing the associated answer generator to contact external sites. Embodiments of the invention may enable users to add content recognizer configurations, trigger configurations, answer generator subset determinators, and/or answer post-processor configurations which represent execution settings for a particular content recognizer, trigger, answer generator subset determinator, and answer post-processor, respectively. These configurations, in at least one embodiment, collectively called plug-in configurations, may contain any of the following: 1) settings used by the implementation of the associated plug-in; and 2) permissions given by the user to the associated plug-in.

FIG. 1 illustrates a block diagram illustrating a data processing system for computing answers to queries provided by users by executing user-created plug-ins, according to one or more embodiments of the invention. As shown in FIG. 1, one or more embodiments include system 200 that may provide inline search results from user-created search verticals in response to general web-search queries. In at least one embodiment, the system 200 may include a user computer 201, such as a computing device including but not limited to a desktop computer, a mobile computer or any other form of a computing system. In one or more embodiments, the user computer 201 may include a browser 202 accessible via a user interface (UI) 204. The browser 202 may have a browser plug-in 203 installed that is able to enhance the user interface 204 to automatically send search queries when the user selects text and display answers in a more optimal fashion.

In at least one embodiment of the invention, user computer 201 may be coupled via a network 1 240 to an answer engine server 210. In addition, user computer 201 may be coupled via a network 2 250 to a content provider 1 231 and/or a content provider 2 232. The answer engine server 210 may include a controller 211, a user database 212, a plug-in database 214, and a plug-in executor 213. In one or more embodiments, the system 200 may include a knowledge database 215, a recognition index 216, term/recognition key index 218, recognizer index 219, and/or generic database 280.

In at least one embodiment, controller 211 may receive one or more queries from one or more user computers 201, coordinate the process of computing answer results, and send the answer results back to the one or more user computers 201. Although controller 211 is depicted as a single controller in FIG. 1, controller 211 may be any number of separate controllers acting independently. Furthermore, in at least one embodiment, the one or more controllers 211 may not be located on the same server, and controller 211 may be in communication with other controllers located on other servers. As shown in FIG. 1, answer engine 210 may be coupled via network 3 260 to external service 1 271 and/or external service 2 272.

In one or more embodiments of the invention, controller 211 may internally use a content recognizer set determinator 217 and an answer generator set determinator 220, as will be described below. In at least one embodiment, content recognizer set determinator 217 and/or answer generator set determinator 220 may be implemented as external modules or plug-ins created by users. The user database 212, in embodiments of the invention, may store information about users. For each user, in at least one embodiment, the stored information may include: 1) personal information such as e-mail addresses, phone numbers, and mailing addresses; 2) credentials and/or authentication keys (such as OAuth session keys) for external accounts such as social media accounts such as Facebook and Twitter, 3) preferences for answer generation, including a list of trigger-answer generator associations, a list of answer generator subset determinators, a list of answer post-processors, plug-in configurations; and 4) records of or summary statistics on user activities such as selecting or closing an answer result.

According to one or more embodiments, plug-in database 214 may store information about user-created plug-ins, including: 1) metadata such as names, categories, tags, author names, versions, etc.; 2) access permissions such as whether each plug-in can be used or updated by all users or only a subset of users; 3) data used to execute each plug-in, such as source code to be interpreted, binary executable programs, regular expressions, function parameters, etc., or locations of such data; 4) a set of permissions requested by each plug-in that allow the plug-in to access user information or communicate with external services; and 5) information on each plug-in's utility, such as user ratings, reviews, usage logs and/or counts, scores, etc.

In at least on embodiments, knowledge database 215 may store facts, for example, a fact that "GOOG" is the stock symbol for Google. Furthermore, in embodiments, recognition index 216 may map keywords to recognition results, or specifications of how to generate recognition results. In addition, the recognition index may be populated by the developers of the answer engine as well as users.

By way of at least one embodiment, system 200 may include a term/recognition key index 218 that may contain mappings from query terms and recognition keys to answer generators, and may allow the mappings to be searched efficiently. For example, users may upload mappings, and a weight for each mapping, directly into term/recognition key index 218. For each mapping, in at least one embodiment, the term/recognition key index 218 may store a reference to the user that uploaded the mapping as well as statistics such as hit counts, answer generator usage counts, etc., such that that the effectiveness of the mapping may be measured. These statistics may be per-user to keep track of a mapping's suitability for each user individually. The term/recognition key index 218, in at least one embodiment, may be populated by the developers of the answer engine as well as users.

By way of at least one embodiment, system 200 may include a recognizer index 219 that maps content recognition keys to content recognizers that may output recognition results with the given recognition key. For example, users may upload mappings, and a weight for each mapping, directly into recognizer index 219. For each mapping, in at least one embodiment, the recognizer index 219 may store a reference to the user that uploaded the mapping as well as statistics pertaining to hit counts, content recognition results, etc., such that that the effectiveness of the mapping may be measured. These statistics may be per-user to keep track of a mapping's suitability for each user individually. The recognizer key index 219, in at least one embodiment, may be populated by the developers of the answer engine as well as users.

In one or more embodiments, system 200 may include a generic database 280 that may store data to be used by plug-ins. Generic database may be populated by plug-in developers with any information that may be useful for the plug-in, that is desired to be accessible in a rapid manner. For example, a plug-in developer writing a chemical symbol content recognizer may store the chemical symbol, English name, atomic number, and atomic weight for each chemical element. Each plug-in developer may have a limit on how much data the plug-in developer may store in the generic database. The data may be in any format and may have any meaning the plug-in developer chooses. If implemented as a relational database, generic database may include multiple user-defined tables, or a single table that has multiple text, numeric, and date fields, some of which may be indexed for fast retrieval. If a single table is used, each row may contain an identifier of which plug-in developer uploaded the data.

In at least one embodiment of the invention, each of the data stores (user database 212, plug-in database 214, knowledge database 215, recognition index 216, term/recognition key index 218, recognizer index 219, and generic database 280) may either include a fixed schema, such as a relational database, or include a schema-less database such as a document database or a search index. Although each data store is depicted as a single data store in FIG. 1, each of the user database 212, the plug-in database 214, the knowledge database 215, the recognition index 216, term/recognition key index 218, recognizer index 219, and generic database 280 may be any number of separate data stores in communication with each other. Furthermore, in at least one embodiment, the data stores need not be located on the same server. In addition, each data store may be in communication with other data stores located on other servers.

In one or more embodiments, plug-in executor 213 may execute plug-ins created either by a user or by the answer engine provider. If a plug-in is created by a user, in at least one embodiment, the plug-in executor 213 may execute the plug-in in a sandboxed environment, such that an execution time, memory usage, call stack depth, access to system and network resources, and access to user information may be monitored and limited. In at least one embodiment, if the plug-in is created by the answer engine provider, the plug-in executor 213 may not constrain the execution environment. In one or more embodiments, plug-in executor 213 may expose to each plug-in a dictionary mapping keys to values that represents the context of the answer request. For example, the context may contain 1) user information, such as the user's name, email address, phone number, address, social media user names, etc.; 2) the user's current location; 3) the location (such as URL) of the document the user is currently viewing; 4) protocol headers that the user computer 201 sent to the answer engine 210; 5) previous answer queries sent by the user, and their associated results, 5) the plug-in configuration for the plug-in if the user has one; and 6) options for the plug-in specified in the answer query. In at least one embodiment, depending on one or more permissions granted by the user, the plug-in executor may grant plug-ins access to the following APIs: 1) browser APIs, such that plug-ins may load and parse web pages, perform HTTP requests to other sites, etc. 2) social networking APIs such as an API to search the user's friend's status updates; 3) APIs to query knowledge database 215, recognition index 216, and generic database 280; and 4) APIs to read and write state information used by individual plug-ins to cache data, track history, or for other purposes in accordance with the field of invention.

According to one or more embodiments, plug-in execution may involve running programs, in either binary format or source format, uploaded to the answer engine by the user, using a virtual machine such as the Java Virtual Machine, or an interpreter, such as a JavaScript interpreter (examples include Mozilla Rhino and the V8 JavaScript Engine). Although plug-in executor 213 is depicted as a single plug-in in FIG. 1, in one or more embodiments, plug-in executor 213 may be any number of separate plug-in executors that may execute in parallel. Furthermore, plug-in executor 213 may not be located on the same server. In addition, plug-in executor 213 may be in communication with other plug-in executors located on other servers.

As shown in FIG. 1, according to at least one embodiment, system 200 lacks a typical web index from keywords to URLs and documents that are present in most search engines. Since web indices are typically on the order of terabytes or petabytes, omitting the web index yields huge storage savings. In at least one embodiment, system 200 may employ a web index, however such a web index is not critical to the operation of the answer engine.

Figure 2:
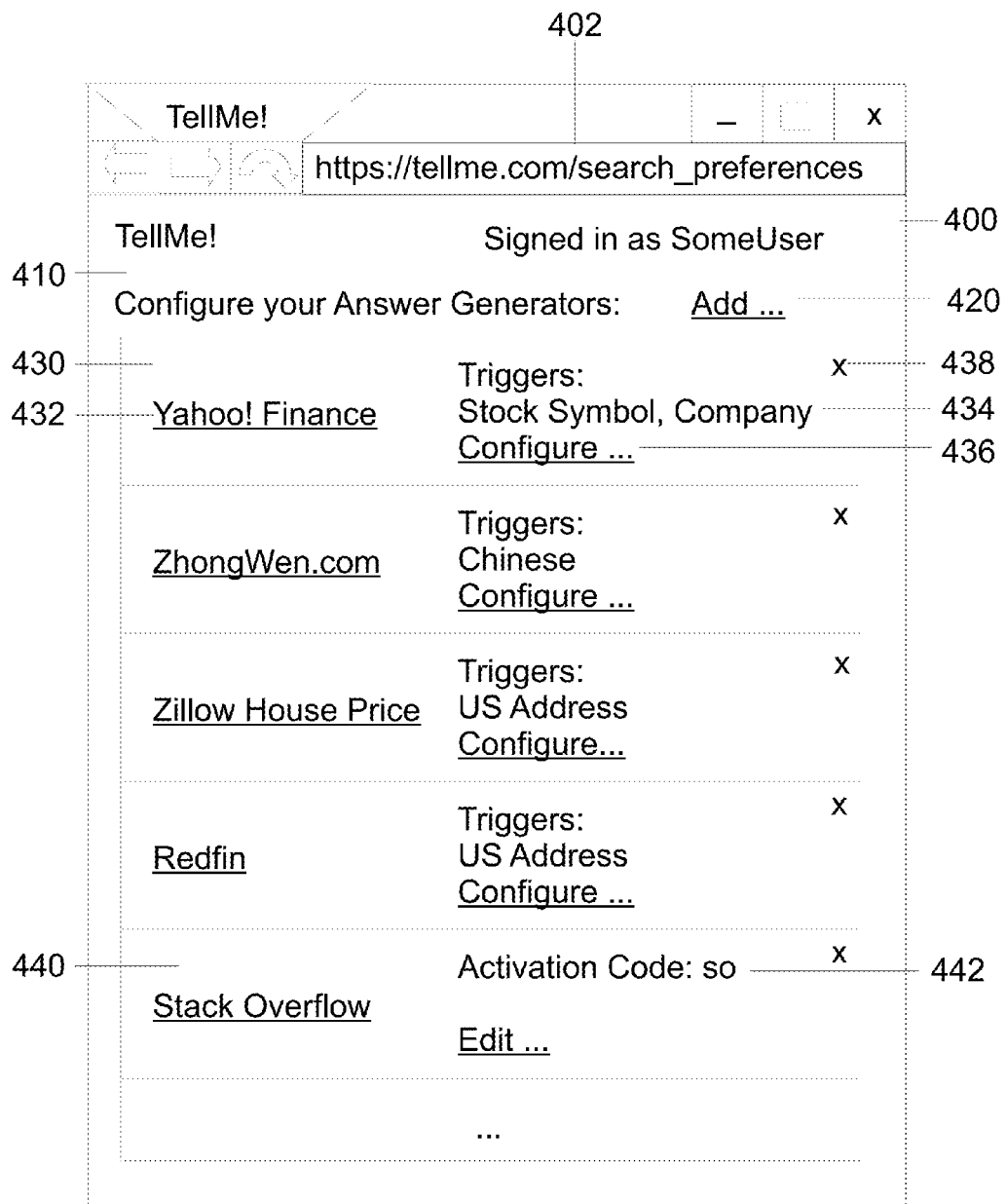
FIG. 2 illustrates a user interface that allows users to customize the data processing system for computing answers to queries provided by users by executing user-created plug-ins, according to one or more embodiments of the invention

FIG. 2 illustrates a user interface that allows users to customize the data processing system for computing answers to queries provided by users by executing user-created plug-ins, according to one or more embodiments of the invention. As shown in FIG. 2, a user interface is implemented in a web page, but other similar user interfaces may be implemented in mobile applications or native desktop applications. According to at least one embodiment, FIG. 2 illustrates a web page 400 and an address bar 402, wherein a user may arrive at the web page 400, by logging into https://tellme.com/, selecting a link leading the user to the location in the address bar 402. In at least one embodiment, the user interface may display a header 410 including information about the web page address and/or information about the logged in user, and the list of answer generators that the user may have previously selected. In one or more embodiments, each item in the list resembles items 430 or 440. Item 430, in at least one embodiment, may, for example presenting the user configuration of the Yahoo! Finance answer generator, contain: 1) Link 432 that links to a page with more details about the answer generator, a list of triggers 434 which indicate the triggers associated with the answer generator in the user's profile (i.e. the presence of trigger-answer generator associations), and button 436 which allows the user to edit his settings for the answer generator by displaying a popup. In at least one embodiment, item 430 may include close button 438 that may allow the user to close one or more answer generators, such as the Yahoo! Finance answer generator. Item 440, in at least one embodiment, may, for example, present the user configuration of the Stack Overflow answer generator, and also display an activation code 442 that may activate the answer generator explicitly in an answer query. In one or more embodiments, the user may remove the Yahoo! Finance answer generator, deleting all of the user's chosen trigger-answer generator associations, by selecting button 438. In one or more embodiments, the user may select link 420 to view a list of available answer generators, such that that the user may add more answer generators to the user's preferences.

Figure 3:
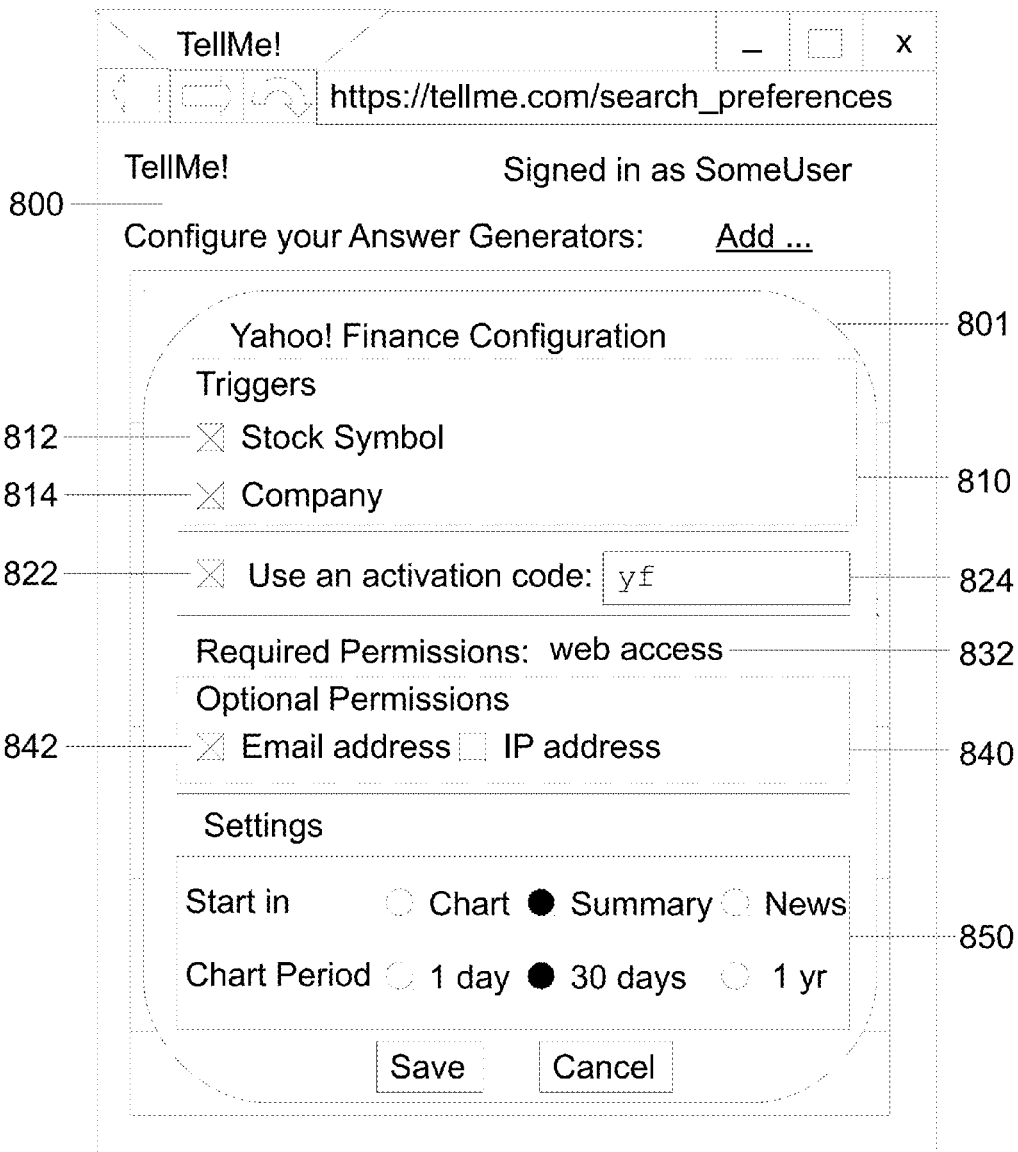
FIG. 3 illustrates the user interface of FIG. 3, in a state where the user has selected an answer generator to configure, and the user interface presents options to the user, according to one or more embodiments of the invention.

FIG. 3 illustrates the user interface of FIG. 2, in a state where the user has selected an answer generator to configure, and the user interface presents options to the user, according to one or more embodiments of the invention. FIG. 3 illustrates a user interface that allows users to modify settings for an answer generator. As shown in FIG. 3, web page 800, similar to web page 400 of FIG. 2, includes a user interface displays popup 801 in response to the user selecting button 436. In at least one embodiment, popup 801 shows the settings for the selected answer generator, and allows the user to modify the settings. In container 810, in one or more embodiments, the available triggers for the answer generator are listed and the user may select or de-select triggers with checkboxes 812 and 814. In this example, both the Stock Symbol trigger and Company trigger are selected. In at least one embodiment, checking checkbox 822 may allow the user to set an activation code used for the answer generator, which is "yf" in this example. The input box 824, according to one or more embodiments, allows the user to type the desired activation code. Text 832, according to at least one embodiment, may list the required permissions that must be granted such that the answer generator may function properly. In this example, web access is required by the plug-in. In one or more embodiments, box 840 may list the optional permissions requested by the answer generator, which may be helpful but are not required.

In at least one embodiment of the invention, the user may select the optional permissions to grant to the answer generator by selecting or de-selecting checkbox 842 and other similar checkboxes as shown in FIG. 3. In the example shown, the user has chosen to grant the answer generator access to the user's email address but not the user's IP address. In one or more embodiments, other access may be to the user's name, IP address, phone numbers, mailing address, current location, logins and access keys to external sites, birthday, references to other users, or other information. In one or more embodiments, other access may be to perform actions on behalf of the user, such as posting content on an external site or placing audio calls. According to one or more embodiments, container 850 may contain a user-defined form to gather settings for the plug-in. In this example, the user may select what kind of content to display (a chart, summary, or news about a stock) and the period of stock price charts, such as 1 day, 30 days, 1 year, etc. The creator of an answer generator may upload a content template for the form as part of the definition of the answer generator. In at least one embodiment, the user interface may sanitize the content so any untrusted, malicious code is rendered harmless, and the user interface may gather the setting form's input values when the form is submitted, and the answer engine service saves the input values as part of the answer generator configuration for the answer generator. In at least one embodiment, the user interface may include a save button and a cancel button that may allow a user to save and/or cancel any inputted data and/or selection. As one of ordinary skill in the art would appreciate, other answer generators, in addition to a Yahoo! Finance answer generator, are within the scope of art of the invention.

Operation

Figure 4:
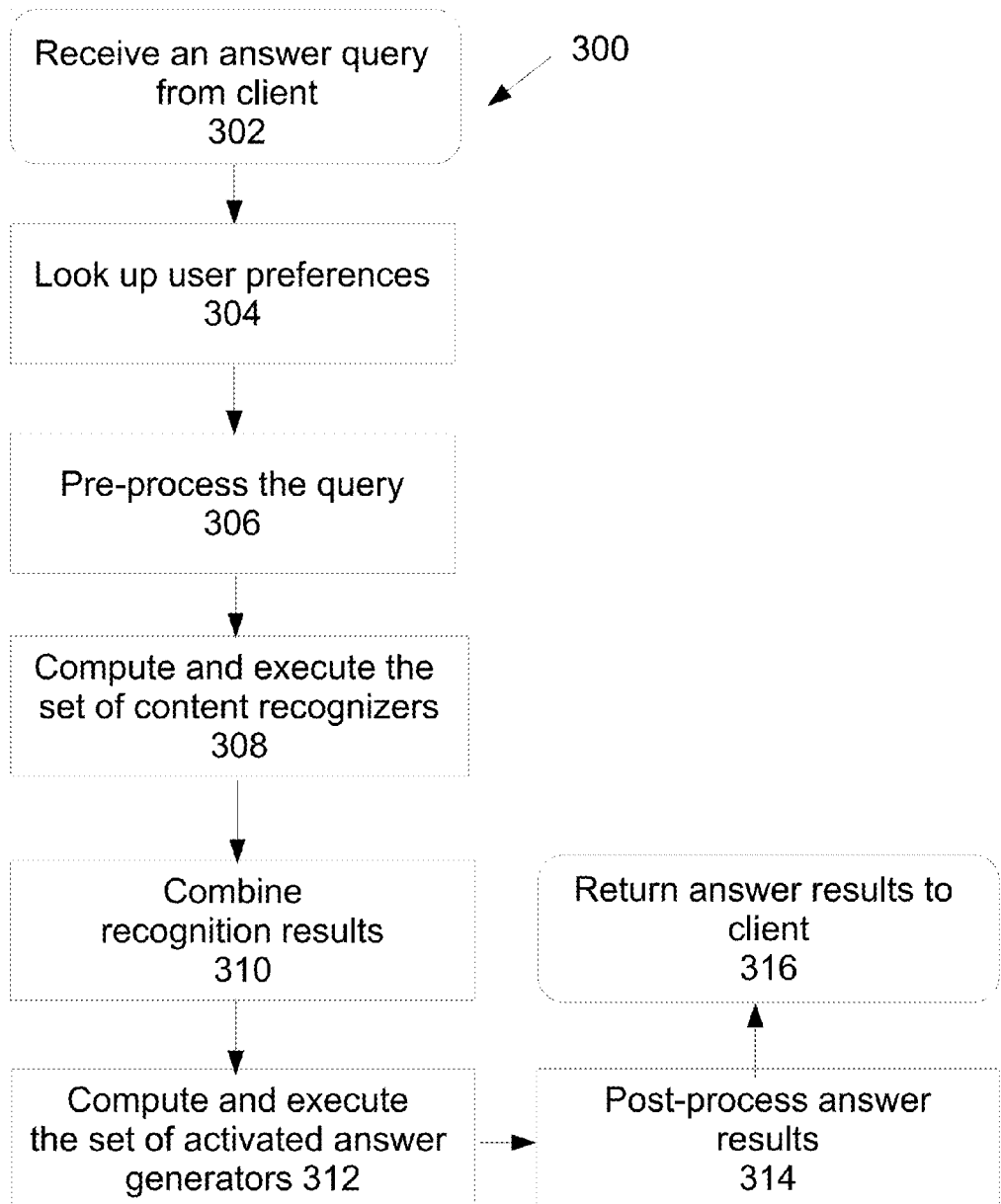
FIG. 4 illustrates a flowchart illustrating a computer-implemented method of computing answers to queries by executing user-created plug-ins, according to one or more embodiments of the invention.

FIG. 4 illustrates a flowchart illustrating a computer-implemented method of computing answers to queries by executing user-created plug-ins, according to one or more embodiments of the invention. As shown in FIG. 4, in at least one embodiment, an exemplary process 300 for returning answer results from the answer engine in response to an answer query begins at step 302, wherein an answer query may be received from a user (client). In one or more embodiments, at step 304, the answer engine may identify the user submitting the answer query and may look up the user's preferences in the user database 212. For example, the answer engine may look up the user's list of trigger-answer generator associations and answer generator configurations. According to at least one embodiment, if no user is associated with the request (such as when there is no logged in user), the answer engine may use a default list of trigger-answer generator associations. In at least one embodiment, the answer engine may look up the user's content recognizer configurations, trigger configurations, and/or answer post-processor configurations.

By way of one or more embodiments, at step 306, the answer engine may pre-process the answer query. In at least one embodiment, first, the answer engine may extract and remove activation codes and per plug-in settings from the answer query. Activation codes may indicate that a particular answer generator is to be executed, regardless of content recognition or triggers. For example the activation code "?java" may indicate that a Java programming language documentation answer generator is to be executed. Activation codes may explicitly be chosen by the user for each answer generator the user explicitly selects, and each answer generator may have a default, unique activation code, which activates the answer generator regardless of whether or not the user has explicitly selected answer generator. Activation codes may also be followed by options for the associated answer generator, such that if the string "?java(version: 1.7)" appears in the query, the Java programming language documentation answer generator may be given the option string "version: 1.7" and may use it to send the user to documentation for the Java 1.7 API. As such, the answer engine may record the order of activation codes found in the answer query. In at least one embodiment, the answer engine may parse and record options for each answer generator. In one or more embodiments, the search query may be stripped of all activation codes and plug-in options before passing it to the next step, such that the query string "?java(version: 1.7) String" may result in the query "String" being sent to the next step. In addition, in one or more embodiments, the answer engine may remove leading and trailing whitespace.

As shown in FIG. 4, in at least one embodiment, at step 308, the answer engine may execute the content recognizer determinator, using the pre-processed answer query as input. The content recognizer determinator, in one or more embodiments, may output a set of content recognizers, and the answer engine may use the plug-in executor 213 to execute each content recognizer to produce a list of recognition results. In one or more embodiments, the answer engine may execute two special, system-defined content recognizers: 1) a content recognizer searches the knowledge database 215 for terms in the answer query, and if found, classifies each term and adds additional recognition results for each term; 2) a content recognizer that searches the recognition index 216 for terms in the answer query, and if found, outputs the corresponding recognition result(s). In at least one embodiment, the answer engine may execute popular and/or highly effective content recognizers even if they are not selected by the user. As such, in one or more embodiments, the answer engine may collect all recognition results from all content recognizers into a single list. In at least one embodiment, if any extra terms for the term/recognition key index 218 were output by content recognizers, the answer engine may collect them together for use in step 312. The answer engine, in one or more embodiments, may execute content recognizers with some degree of parallelism to reduce the overall time required for step 308.

At step 310, in at least one embodiment, the answer engine may compute the combined recognition results by grouping recognition results that have the same recognition key together. For example, using the notation (A, B) to indicate an ordered pair containing members A and B, and the notation [X, Y, Z] to indicate a list containing elements X, Y, and Z, a recognition result is an ordered pair (K, V), where K is the recognition key and V is the dictionary of values. For example, if the collected list of recognition results is

[(K1, V1), (K2, V2), (K2, V3), (K1, V4)]

Then the combined recognition result list is

[(K1, [V1, V4]), (K2, [V2, V3])]

In other embodiments, the answer engine may combine recognition results in a different manner, such as creating a flat list containing all content recognition results.

At step 312, in one or more embodiments, the answer engine may use answer generator set determinator 220 to compute the set of answer generators to execute, using the pre-processed answer query and combined recognition results as input. In at least one embodiment of the invention, the output of the answer determinator may be a set of answer generators. If the answer query contains activation codes, the answer engine adds the associated answer generators to the set of answer generators. In one or more embodiments, plug-in executor 213 may then execute each answer generator in the final set of activated answer generators. If any options for answer generators were specified in the answer query, they may be passed to the respective answer generator. In one or more embodiments, the answer engine may execute answer generators with some degree of parallelism to reduce the overall time required for step 312.

At step 314, in at least one embodiment of the invention, the answer engine may process the list of answer results produced in step 310. First, in one or more embodiments, the answer engine may eliminate any duplicate answer results (such as those having the same answer location or inline content as another answer result). Second, in one or more embodiments, the answer engine may order answer results that originate from answer generators that were explicitly activated by activation codes in the answer query according the order the respective activate codes appear in the answer query. As such, for example, if the answer query was "?zillow ?gm 08034", and the activation codes for the Zillow answer generator and Google Maps answer generator are "zillow" and "gm", respectively, the answer engine may ensure that answer results produced by the Zillow answer generator precede answer results produced by the Google Maps answer generator. For answer results that are produced by answer generators not activated by an activation code, in at least one embodiment, the answer engine may order the answer results according their relevance score, with answer results with higher relevance scores first. In one or more embodiments, the answer engine may use data mining techniques to order answer results, based on reports of user activity manipulating search results in a user interface or other information.

At step 314, in at least one embodiment, after the answer engine performs initial ordering on the answer results, it may send the list of answer results to the first result post-processor in the list of result post-processors. The plug-in executor 213, in at one or more embodiments, may execute the first result post-processor and output a resultant list of answer results. As such, in at least one embodiment, the resultant list is sent to the second result post-processor, and so on, until the last result post-processor executes and produces a final list of answer results. In embodiments of the invention, the answer engine may optionally sanitize each answer result (except ones produced by a trusted answer generator) such that that its content may safely be included in the user interface, and build a list of answer results. In at least one embodiment, the answer engine may sanitize answer results with some degree of parallelism to reduce the overall time required for step 314. At step 316, in one or more embodiment, answer engine may send the list of answer results output in step 314 back to user computer 201.

According to one or more embodiments of the invention, the entire process of generating answers in response to a user query may use asynchronous request handling, such that the request may not require a dedicated thread to stay running (and consuming resources) while waiting for plug-ins to execute. Instead, in at least one embodiment, the answer engine may start the process of generating answers in another thread, then suspend or exit the thread that received the request. When the answers have been generated, in one or more embodiments, the answer engine may use a different thread to send back the results to the user computer 201. Some technologies that enable asynchronous request handling include Jetty Continuations, Java Asynchronous Servlets, node.js, Tornado and Twisted for Python, and EventMachine for Ruby.

In at least one embodiment of the invention, the answer engine may split the results of answer generator determiner 220 into two subsets: 1) a set of answer generators to be executed by plug-in executor 213; and 2) a set of answer generators to be recommended to the user, but not actually executed. Typically, the answer generators selected by the user will be executed, and answer generators that are not selected by the user will be recommended but not executed. If the answer engine recommended any answer generators, in at least one embodiment, the answer engine may include links or identifiers to the answer generators in the response that contains the answer results.

Content Recognizer Set Determination Process

First Embodiment

By way of one or more embodiments, at step 308 of process 300, the process may rely on a content recognizer set determinator to output the set of content recognizers to execute. Possible embodiments of content recognizer set determinators are discussed below in FIG. 5, FIG. 6 and FIG. 7.

Figure 5:
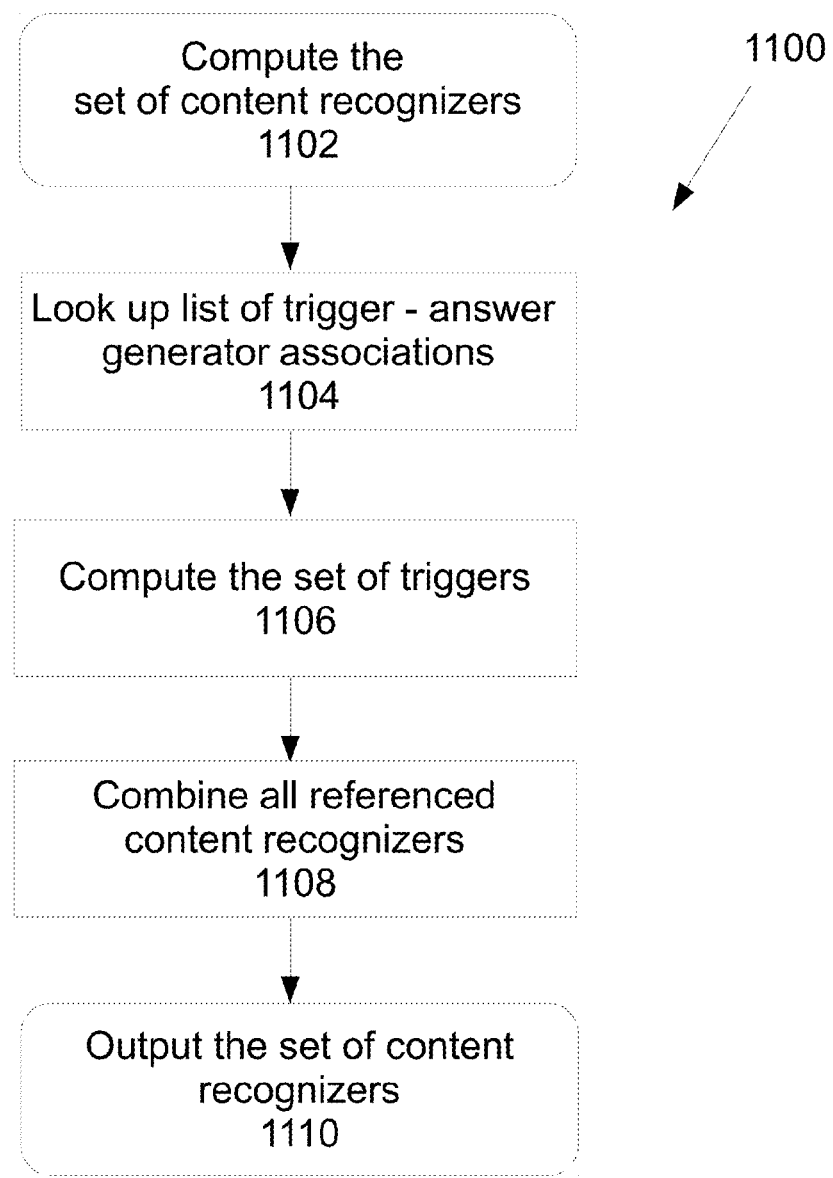
FIG. 5 illustrates a flowchart illustrating a first embodiment of a content recognizer set determinator, in which triggers are used.

FIG. 5 illustrates a flowchart illustrating a first embodiment of a content recognizer set determinator, in which triggers are used. As shown in FIG. 5, in one or more embodiments, process 1100 begins with the content recognition determinator receiving the pre-processed answer query from the answer engine at step 1102 and computing the set of content recognizers. At step 1104, the content recognizer set determinator may identify the user submitting the answer query and may look up the user's list of trigger-answer generator associations. For example, in at least one embodiment, if no user is associated with the request (such as when there is no logged in user), the content recognizer set determinator may use a default list of trigger-answer generator associations. In at least one embodiment of the invention, at step 1106, the content recognizer set determinator may compute the set of triggers by iterating over the list of trigger-answer generator associations and may add all referenced triggers to an initially empty set of triggers. At step 1108, in one or more embodiments, the content recognizer set determinator may compute the set of content recognizers by iterating over the trigger set and may add, and/or combine, all referenced content recognizers to an initially empty set of content recognizers. As discussed above, for example, a trigger may include metadata indicating which content recognizers to execute. In at least one embodiment, process 1100 includes step 1110, wherein the computed set of content recognizers may be output for use by the answer engine.

Content Recognizer Set Determination Process

Second Embodiment

Figure 6:
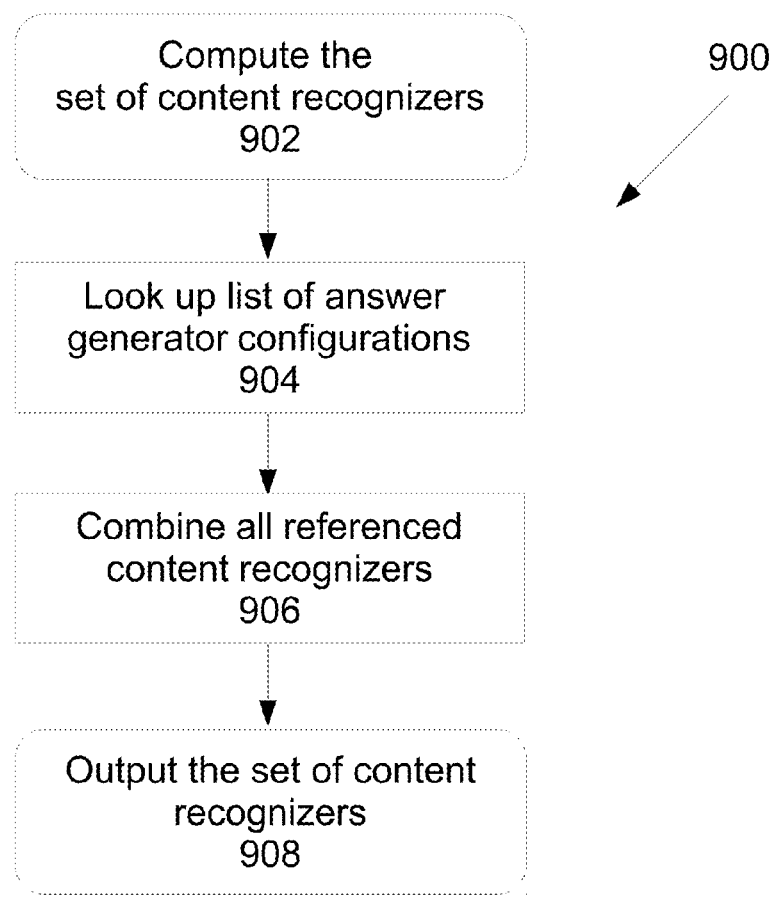
FIG. 6 illustrates a flowchart illustrating a second embodiment of a content recognizer set determinator, in which answer generator configurations are used.

FIG. 6 illustrates a flowchart illustrating a second embodiment of a content recognizer set determinator, in which answer generator configurations are used. As shown in FIG. 6, in at least one embodiment, process 900 begins with step 902 wherein the content recognition determinator may receive the pre-processed answer query from the answer engine and may compute the set of content recognizers. At step 904, in one or more embodiments, the content recognizer set determinator may identify the user submitting the answer query and may look up the user's list of answer generator configurations. In at least one embodiment, if no user is associated with the request (when as there is no logged in user), the content recognizer set determinator may use a default list of answer generator configurations. In embodiments of the invention, the content recognizer set determinator may look up keywords in the answer query in term/recognition key index 218 to yield a set of answer generators (without configuration), following the process of FIG. 9, as will be described below, except omitting step 1308, due to the content recognition not being executed yet; and may send the set to the next step.

In at least one embodiment of the invention, at step 906, the content recognizer set determinator may analyze the answer generators, either output directly by step 904, or referenced by the answer generator configurations output by step 904, to collect the required content recognizers. In embodiments, if the metadata for each answer generator contains a set of content recognizers to execute, then the content recognizer set determinator may collect content recognizers directly from the metadata of the answer generators. In embodiments, if there exist trigger-answer generator associations, the content recognizer set determiner may scan the triggers for each answer generator output by step 904, and may include all or a subset of the content recognizers referenced by the triggers. At step 908, the computed set of content recognizers may be output for use by the answer engine.

Content Recognizer Set Determination Process

Third Embodiment

Figure 7:
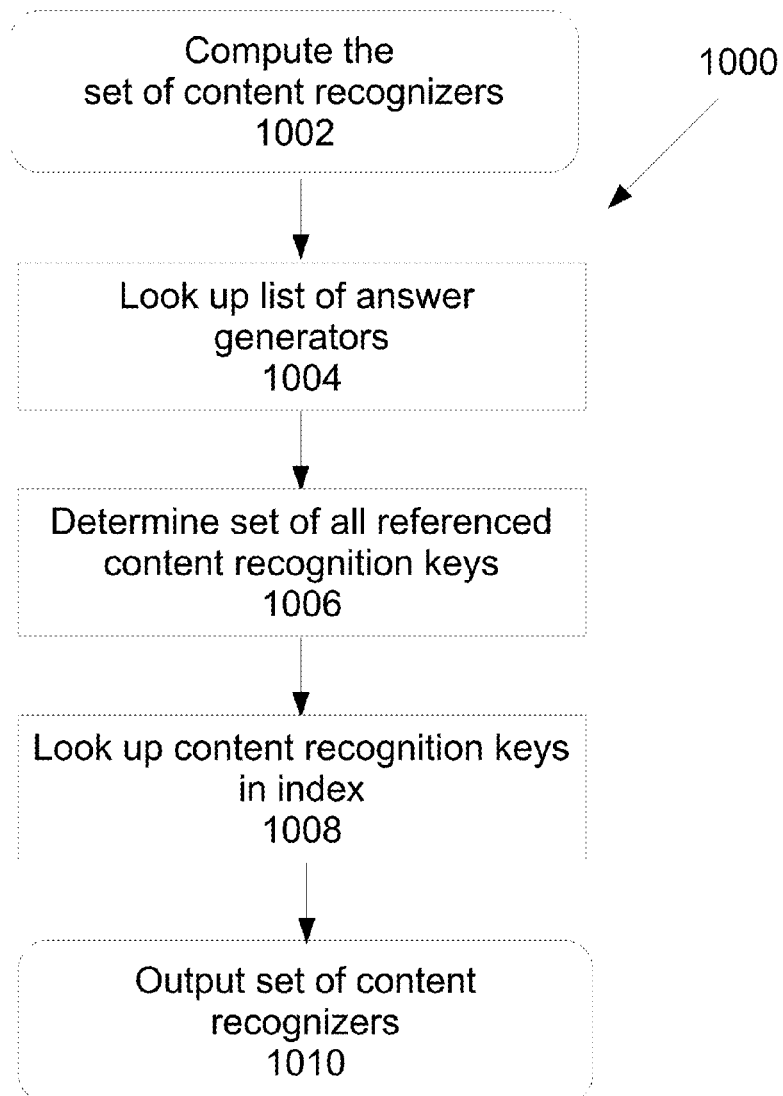
FIG. 7 illustrates a flowchart illustrating a third embodiment of a content recognizer set determinator, in which an index of content recognition keys to content recognizers is used.

FIG. 7 illustrates a flowchart illustrating a third embodiment of a content recognizer set determinator, in which an index of recognition keys to content recognizers is used. As shown in FIG. 7, in at least one embodiment, process 1000 begins at step 1002 wherein the content recognition determinator may receive the pre-processed answer query from the answer engine and may compute the set of content recognizers. At step 1004, in one or more embodiments, the content recognizer set determinator may identify the user submitting the answer query and may look up his list of answer generator configurations. In embodiments of the invention, if no user is associated with the request (such as when there is no logged in user), the content recognizer set determinator may use a default list of answer generator configurations. As such, in at least one embodiment, the content recognizer set determinator may extract the answer generators referenced by each answer generator configuration. In one or more embodiments, the content recognizer set determinator may look up keywords in the answer query in term/recognition key index 218 to yield additional answer generators, following the processes of FIG. 9, as will be described below, except omitting step 1308, since content recognition has not been executed yet.

At step 1006, in at least one embodiment, the content recognizer set determinator may inspect the metadata for each answer generator output by step 1004. As such, the metadata for each answer generator may contain a set of recognition keys, and the content recognizer set determinator may build a set of all recognition keys from all answer generators. In one or more embodiment of the invention, at step 1008, the content recognizer set determinator may look up each recognition key in recognizer index 219. For example, in at least one embodiment, if a content recognition key is mapped to multiple content recognizers, the content recognizer set determinator may choose all content recognizers or a subset, depending on the past performance of each content recognizer. As such, the content recognizers that result from looking up each content recognition key may be used to build a set of all content recognizers. At step 1010, in embodiments of the invention, the computed set of content recognizers may be output for use by the answer engine.

Content Recognizer Set Determination Process

Other Embodiments

In another embodiment of a content recognizer set determinator, process 900 is modified such that the referenced content recognizers are extracted from each member of the user's list of answer generator subset determinators, instead of from the user's list of answer generator configurations.

According to one or more embodiments, the content recognizer set determinators may look for special recognizer activation codes in answer queries, such as "% book", and add the corresponding content recognizer to the output set.

In one or more embodiments, content recognizer set determinators may be built by combining any or all of the above content recognizer set determinators. Also, in at least one embodiments, the content recognizer set determinators may add highly effective, recommended, popular, and/or sponsored content recognizers to the content recognizer set.

Answer Generator Set Determination Process Embodiments

As described above regarding FIG. 4, step 312 of process 300 relies on an answer generator set determinator to output the set of answer generators to execute. Discussed below are two possible embodiments of answer generator set determinators.

Answer Generator Set Determination Process

First Embodiment

Figure 8:
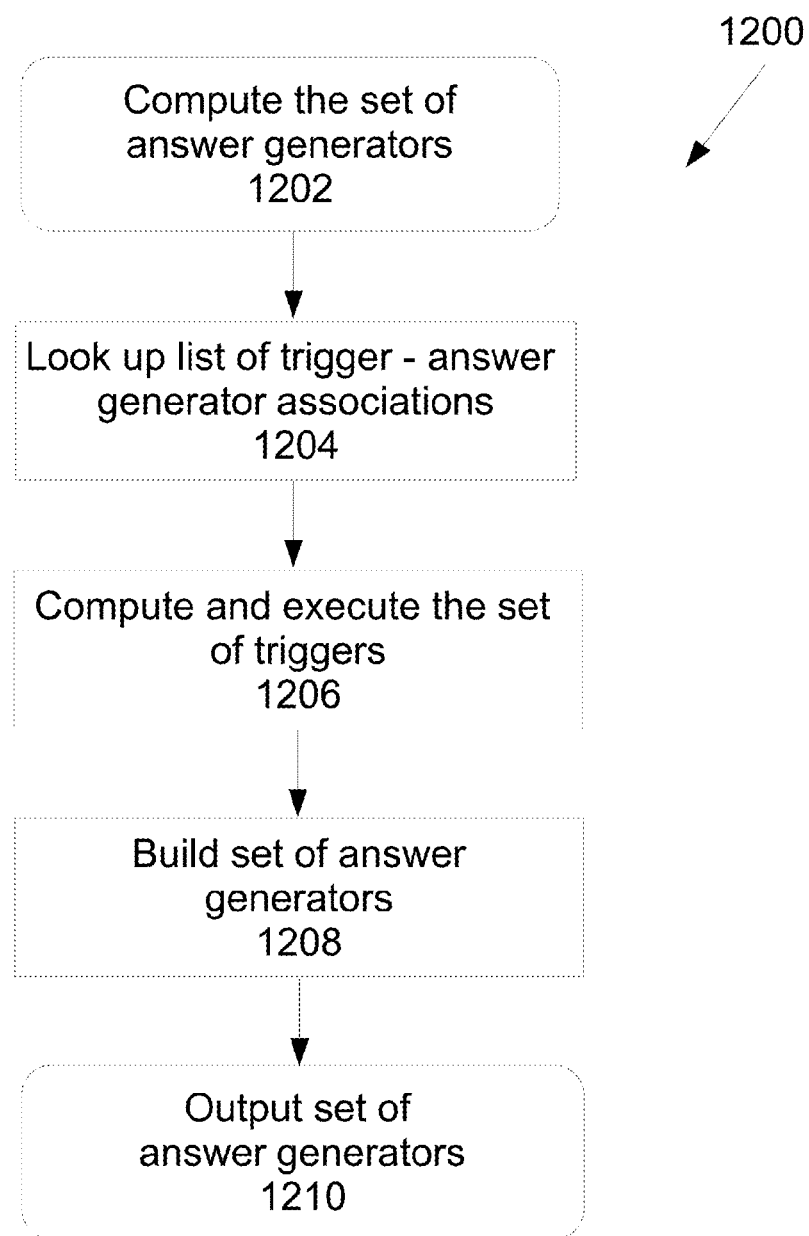
FIG. 8 illustrates a flowchart illustrating a first embodiment of an answer generator set determinator, in which triggers are used.

FIG. 8 illustrates a flowchart illustrating a first embodiment of an answer generator set determinator, in which triggers are used. As shown in FIG. 8, process 1200 includes a process of implementing a first embodiment of an answer generator set determinator. In at least one embodiment, at step 1202, the answer generator set determinator may receive the pre-processed query and combined recognition results from the answer engine. At step 1204, in one or more embodiments, the answer generator set determinator may identify the user submitting the answer query and looks up his list of trigger-answer generator associations. In embodiments of the invention, if no user is associated with the request (such as there is no logged in user), the content recognizer set determinator may use a default list of trigger-answer generator associations.

In at least one embodiment, at step 1206, the answer generator set determinator may compute the set of triggers by iterating over the list of trigger-answer generator associations and may add, and/or combine, all referenced triggers to an initially empty set of triggers. According to one or more embodiments, the answer generator set determinator may use plug-in executor 213 to execute each member of the set of triggers, passing the pre-processed answer query, combined recognition result list, and the term dictionary as input. As such, a mapping from trigger identifiers to a Boolean flag indicating whether the associated trigger activated is provided. In at least one embodiment, the answer engine may execute triggers with some degree of parallelism to reduce the overall time required for step 1206.

At step 1208, in embodiments of the invention, the answer engine may use the user's list of trigger-answer generator associations and answer generator configurations to build a set of answer generators to execute. For each member of the list of trigger-answer generator associations, in at least one embodiment, if the referenced trigger is activated in step 1206, the answer engine may add the referenced answer generator to an initially empty set of answer generators. In one or more embodiments, at step 1210, the computed set of answer generators may be output for use by the answer engine.

Answer Generator Set Determination Process

Second Embodiment

Figure 9:
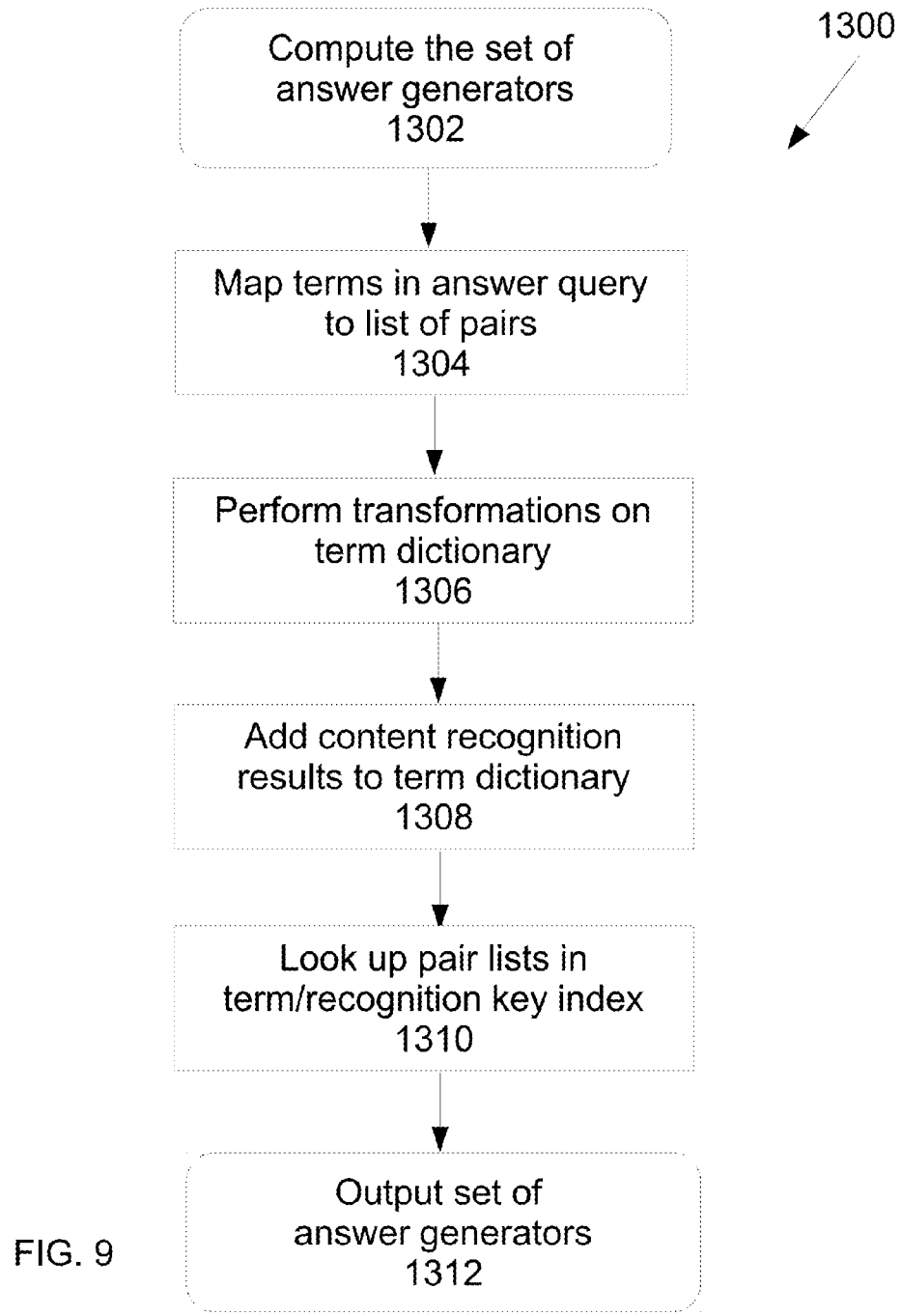
FIG. 9 illustrates a flowchart illustrating a second embodiment of an answer generator set determinator, in which a term/recognition key index is used.

FIG. 9 illustrates a flowchart illustrating a second embodiment of an answer generator set determinator, in which a term/recognition key index is used. As shown in FIG. 9, according to one or more embodiments of the invention, process 1300 begins with step 1302 wherein the answer generator set determinator may receive the pre-processed query, combine recognition results from the answer engine and may compute the set of answer generators. In at least one embodiment, steps 1304 through 1308 may be executed to compute the term dictionary. At step 1304, in embodiments of the invention, the answer generator set determinator may create an initial term/recognition key dictionary by mapping each term T in the answer to query to a list containing a single term-weight pair (T, 1.0), where 1.0 is the initial weight of terms. At step 1306, in at least one embodiment the answer generator set determinator may perform one or more of the following transformations: 1) abbreviations may be expanded, yielding a new term/pair list for each abbreviated word; 2) related words in phrases or names may be grouped together to yield additional new compound term/pair lists; 3) terms that appear to be spelling mistakes that may have corrected spellings, along with some weights, may be added to the mapped list of pairs; 4) terms that are not all lower case characters that may have their lower cased version, may be added to the mapped list of pairs; 5) stop words such as "a", "an", "the", "is", "can", etc. may be removed as dictionary keys entirely or given a lower weight; 6) terms may be stemmed (e.g. "sleep" and "slept" are converted into the same stem), and the stem may be added to the mapped list of pairs; and/or 7) synonyms of each term may be added to the associated pair lists, with some lower weight.

At step 1308, in one or more embodiment, the answer generator set determinator may assign each term that was recognized by a content recognizer an additional pair consisting of the recognition key and the recognition level in the corresponding content recognition result, and as such may yield the final term dictionary. In one or more embodiment, content recognition result may specify additional term-weight pairs to add to the term dictionary. In at least one embodiment of the invention, at step 1310, the answer generator set determinator may use the term dictionary to query term/recognition key index 218. For each list, in one or more embodiments, the terms and recognition keys may be weighted by their recognition level and may be combined together with the "OR" operator. As such, the expressions for each list may be combined together with the "AND" operator. If few or no results are returned by using this query, for example, the answer engine may drop AND clauses until enough results are returned, such that results from term/recognition key index 218 may still exist even if one or more of the terms or recognition keys may not be mapped. In at least one embodiment, the answer engine may group mappings that are the result of the query by answer generator, and may compute an aggregate score for each answer generator, by taking into account: 1) the statistics for each mapping; 2) the user-specified mapping weight for each mapping; and 3) the raw matching score for each mapping returned by the index. In one or more embodiments, at step 1312, the computed set of answer generators may be output for use by the answer engine.

According to at least one embodiment, for example, the answer query may be "10 g of Fat". At step 1304, process 1300 may output the initial mappings which are:

10=>[(10, 1.0)]
g=>[(g, 1.0)]
of=>[(of, 1.0)]
Fat=>[(10, 1.0)]

After performing the transformations in step 1306, the mappings may become:

10=>[(10, 1.0)]
g=>[(g, 1.0), (gram, 0.7)]
of=>[(of, 0.0)]
Fat=>[(Fat, 1.0), (fat, 0.95), (lipid, 0.5), (stout, 0.3)]

The above transformations are presented since the answer engine 1) detected the stop word "of", assigning it a weight of 0.0; 2) expanded the abbreviation of "g" to "gram", with a weight of 0.7 (reflecting that "g" is a very common abbreviation for "gram"); 3) added the lower-cased version of "Fat", "fat", to the list for "Fat"; and 4) added "lipid" and "stout" as a synonyms for "fat".

In at least one embodiments, for example, a content recognizer may recognize "10" as a number with the recognition key "integer", and the recognition level 1.0. In addition, for example, another content recognizer may recognize "g as a unit of measure with the recognition key "unit" and the recognition level 0.9. Finally, for example, a third content recognizer may recognize words in the English language with the recognition key "english" and the recognition level 1.0. In this case, the words "of" and "Fat" may be recognized as English words. After adding content recognition results to the term dictionary at step 1308, in at least one embodiment, the final term dictionary is:

10=>[(10, 1.0), (key:integer, 1.0)]
g=>[(g, 1.0), (gram, 0.7), (key:unit, 0.9)]
of=>[(of, 0.0), (key:english, 1.0)]
Fat=>[(Fat, 1.0), (fat, 0.95), (lipid, 0.5), (stout, 0.5), (key:english, 1.0)]

At step 1310, in one or more embodiments, the search query to term/recognition key index 218 is (10^1.0 OR key:integer^1.0) AND (g^1.0 OR gram^0.7 OR key:unit^0.9) AND (of^0.0 OR key:english^1.0) AND (Fat^1.0 OR fat^0.95 OR lipid^0.5 OR stout^0.5 OR key:english^1.0)

As such, at step 1312, process 1300 may yield a set of answer generators output.

Answer Generator Set Determination Process

Other Embodiments

In one or more embodiments, an answer generator set determination process may be implemented by executing one or more members of the user's list of answer generator subset determinators, and combining the output answer generators.

In one or more embodiments, answer generator set determinators may be built by combining one or more of the above answer generator set determinators. Also, in embodiments of the invention, the answer generator set determinators may add highly efficient, recommended, popular, and/or sponsored answer generators to the answer generator set.

User Interface

Figure 10:
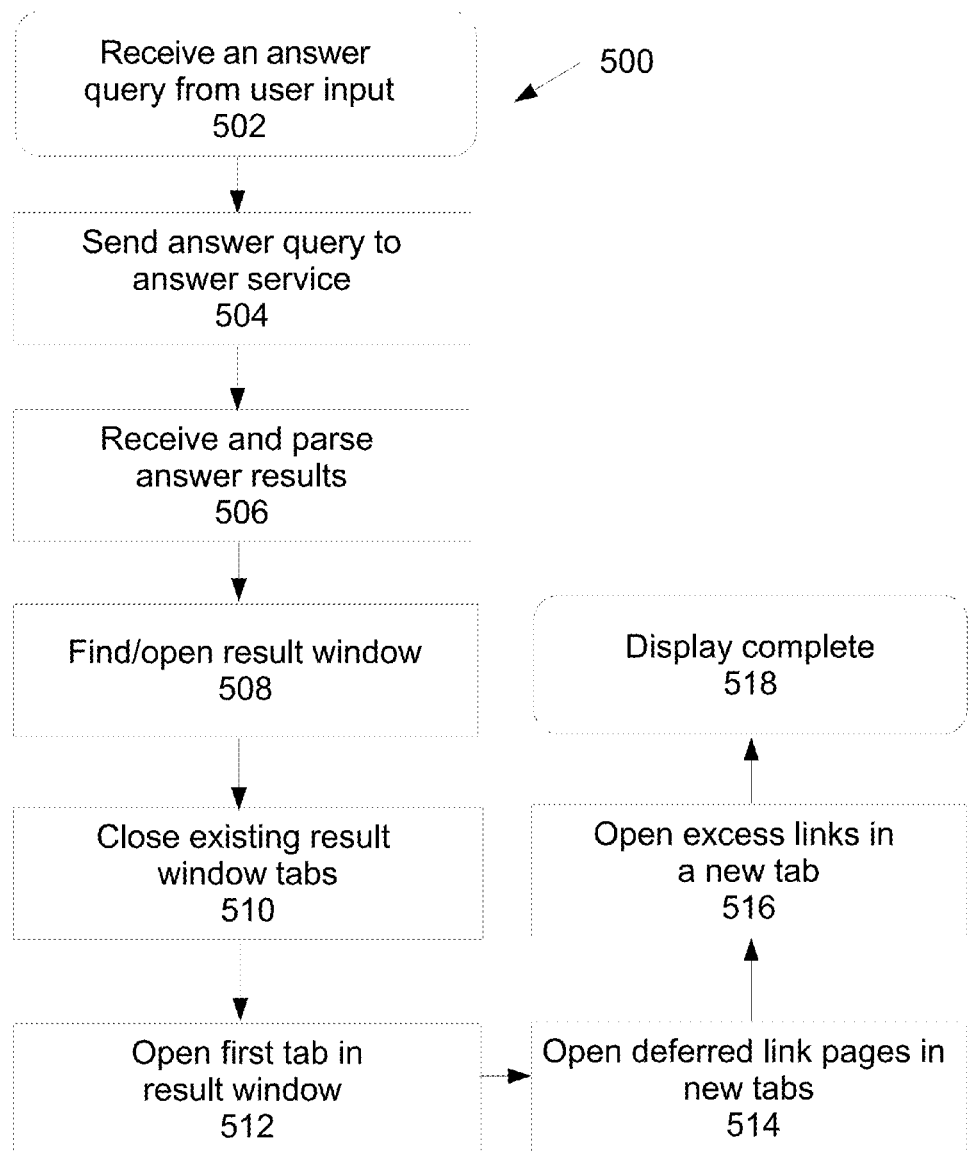
FIG. 10 illustrates a flowchart illustrating a computer-implemented method of displaying answers computed by an answer engine, according to one or more embodiments of the invention.

FIG. 10 illustrates a flowchart illustrating a computer-implemented method of displaying answers computed by an answer engine, according to one or more embodiments of the invention. As shown in FIG. 5, process 500 may display answer results using a browser plug-in, modified tabbed browser, or other client program. At step 502, in at least one embodiment, an answer query may be received by a user interface. In one or more embodiments, this may be the result of the user entering text into an input box, the user selecting text on a web page, or the user interface using voice recognition to convert the user's speech into text. At step 504, in one or more embodiment, the answer query may be sent to the answer engine service, along with metadata and preferences such as: 1) the user's authentication credentials or session identifier, 2) the user's current location; 3) the user's preferred language; 4) an identifier of the client program making the request; 5) the location or contents of the current page the user is viewing; and 6) other preferences the user has specified in the user interface. In at least one embodiment, the client program may use any network protocol such as HTTP, HTTPS, TCP, or UDP to send the request.

According to embodiments of the invention, the client program may receive the response to the request at step 506, at which time the client program may parse the response, which may be in formats such as JSON, XML, or a compressed binary format. The response may contain answer results, in which the client program may group into three categories: 1) inline answer results which to be displayed in the same page; 2) link answer results with a relatively high relevance score, to be displayed in separate browser tabs; and 3) link answer results with a relatively low relevance score. At step 508, in embodiments of the invention, a result window may either be identified, or a new result window may be opened. If a result window has been previously opened due to a previous execution of process 500, in one or more embodiments, its identifier may be retrieved and used to find the window. If the no result window was previously opened, in one or more embodiments, or the previous result window identifier does not reference a currently open window, the client program may open a new result window and saves its identifier for the next execution of process 500.

In at least one embodiment, the result window typically takes up an area of the user interface that does not obscure the area in which an answer query was input, such as another top-level browser window to one side of the browser window in which the answer query was input. In one or more embodiments, by reusing existing result window, the client program may retain the position of the window that may have been moved by the user to a preferred location on his screen. Therefore, the user may not have to repeat the positioning of the result window after every answer query. At step 510, in embodiments of the invention, the client program may close the existing browser tabs of the result window. The browser tabs may have been opened by the client program as a result of the previous execution of process 500. If the user chose to "pin" a browser tab, i.e. indicate that the browser tab is to be kept open, in one or more embodiments, the client program may choose not to close the tab. Also if closing all the tabs would result in the entire result window being closed by the browser, in one or more embodiments, the client program may leave a single tab open.

At step 512, in at least one embodiment of the invention, the client program may open the first tab in the result window. If the inline answer results collectively are more relevant than any other link answer result, in embodiments, the client program may display a page containing inline answer results in the first browser tab. In one or more embodiments, the page containing inline answer results may contain only a subset of all the inline answer results to avoid putting too much content on a single page, with links to the rest of the inline answer results. In embodiments of the invention, the answer engine may sanitize the content of the each inline answer result if it has not been already and if the answer generator that produced the inline answer result is not trusted. Sanitizing content may ensure that the content does not affect other areas of the answer page, and that no malicious code is executed. Alternatively, in at least one embodiment, if the most relevant answer result is a link answer result, the client program may open the location of the most relevant link answer result in the first browser tab. In both steps 512 and 514, the client program may fetch the location using the same cookies/session as if the user opened the location directly, such that the location may contain private or personalized content (i.e. contain content from the deep web).

At step 514, in at least one embodiment, the client program may open additional tabs in the result window. For each link answer result with a relatively high relevance score that was not opened in step 512, in embodiments of the invention, the client program may open a new tab referencing a local page. The client program may use the icon and label in the link answer result to populate the tab itself. The local page may be bundled with the client program and may not require loading content over the network. When the user selects a tab corresponding to a local page, in at least one embodiment, the client program may open the location in the link answer result in the tab. This defers loading answer result locations until the user actually selects a tab, possibly resulting in significant savings in bandwidth, computation, and delay. If the page containing inline answer results was not opened in step 512, in at least one embodiment, the client program may open it in a new tab, between opening local pages, according to the aggregate relevance of the inline answer results and the relevance of the link answer results.

At step 516, in one or more embodiments, the client program may open another tab in the result window referencing another local page, if there are any link answer results with relatively low relevance. The local page may display the link answer results that have a relatively low relevance. By grouping low relevance results into the same page, the client program may avoid overwhelming the user and browser program with too many tabs. According to one or more embodiment, at step 518, the client program has finished loading all tabs into the result window and the display is complete. If at step 508, the client program left an existing tab open to avoid closing the result window, the client program may now close the tab.

Figure 11:
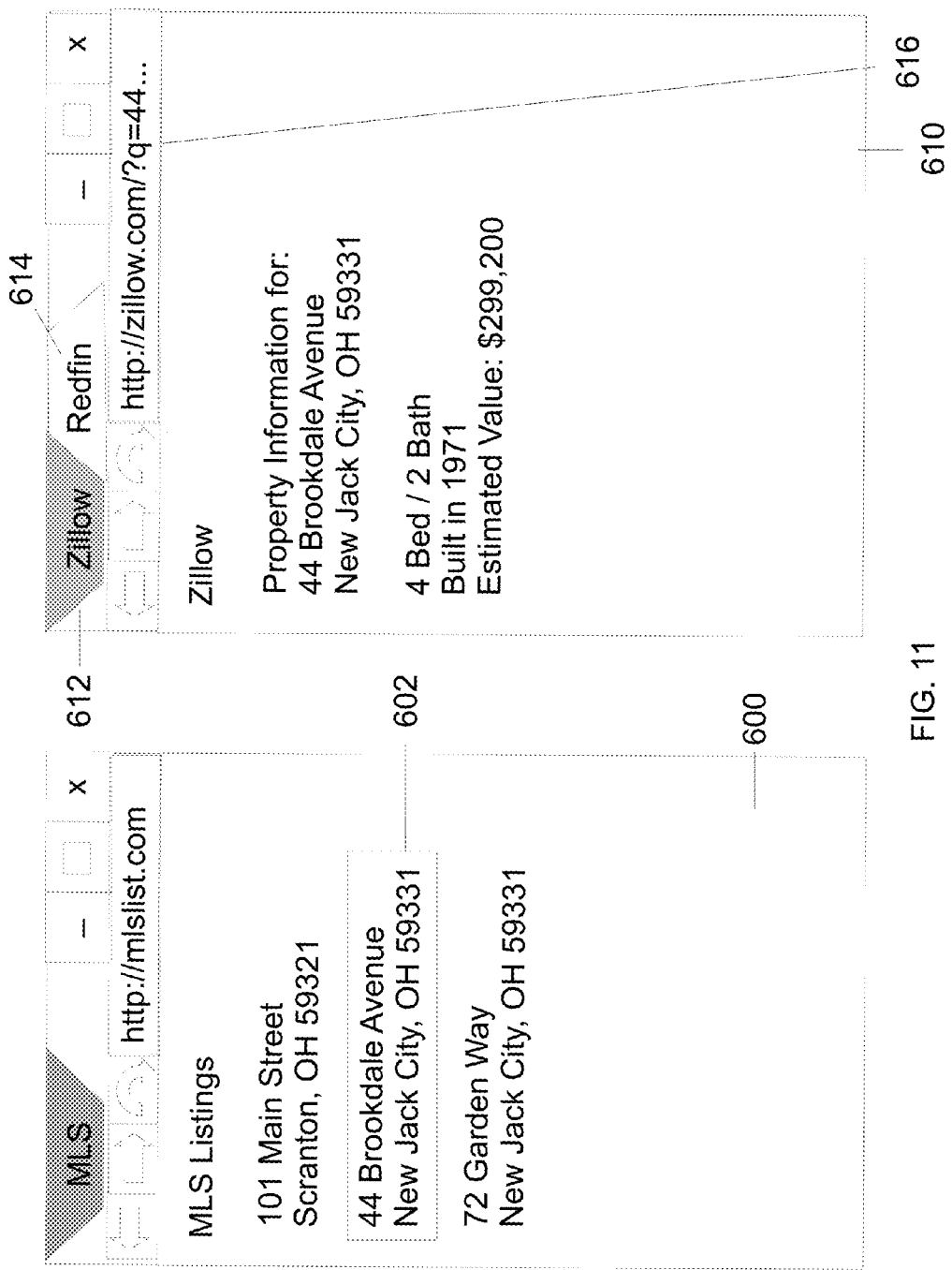
FIG. 11 illustrates a user interface that displays answers computed by the answer engine, in which two link answer results have been returned by the answer engine, according to one or more embodiments of the invention.

FIG. 11 illustrates a user interface that displays answers computed by the answer engine, in which two link answer results have been returned by the answer engine, according to one or more embodiments of the invention. FIG. 11 shows an example scenario of a client program implementing process 500. As shown in FIG. 11, in at least one embodiment, the user may view main browser window 600, which may display a page that contains real estate listings. In at least one embodiment, the user may select an address 602, on the page using a mouse, finger gestures, or other means, and step 502 is considered complete. At step 504, in one or more embodiment, once the address is selected, the client program may send the address as an answer query to the answer engine service, which processes the answer query according to method 300. At step 506, in embodiments, the client program may receive and parses a list of answer results. In this example, the list of answer results includes only two link answer results. At step 508, in one or more embodiments, the client program either finds or opens result window 610 that is shown to the right of the main browser window. In other embodiments, it may be in any position on the screen, including inside the main browser window, or even a different screen. At step 510, if there were any existing, un-pinned tabs in result window 610, the client program may close the tabs. At step 512, in embodiments of the invention, the client program may open the first answer result's location in browser tab 612. In this scenario, the first answer result's answer location (displayed in location bar 616) may be a page in the Zillow web site that shows the property information for a given address. At step 514, in one or more embodiments, the client program may open browser tab 614, using a local page location. The contents of the local page ensure that the icon for Redfin (not shown here) and the label "Redfin" may appear in the tab itself (these are retrieved from the second answer result).

If and when the user clicks tab 614, in one or more embodiments, the client program may cause tab 614 to load content from the second answer result's answer location. In this scenario, the second answer result's answer location may be a page in the Redfin web site, which may show information about the property at an address. Also, if and when the user clicks tab 614, in at least one embodiment, the client program may report to the action answer engine, which may use this information to better order answer results in the future. Step 516, in embodiments of the invention, may not apply since there are no excess links, so the client program may finish at step 518. Later, if the user closes either tab 612 or 614, in at least one embodiment, or rearranges their order, the activity may be reported to the answer engine which may use this information to order future answer results.

Figure 12:
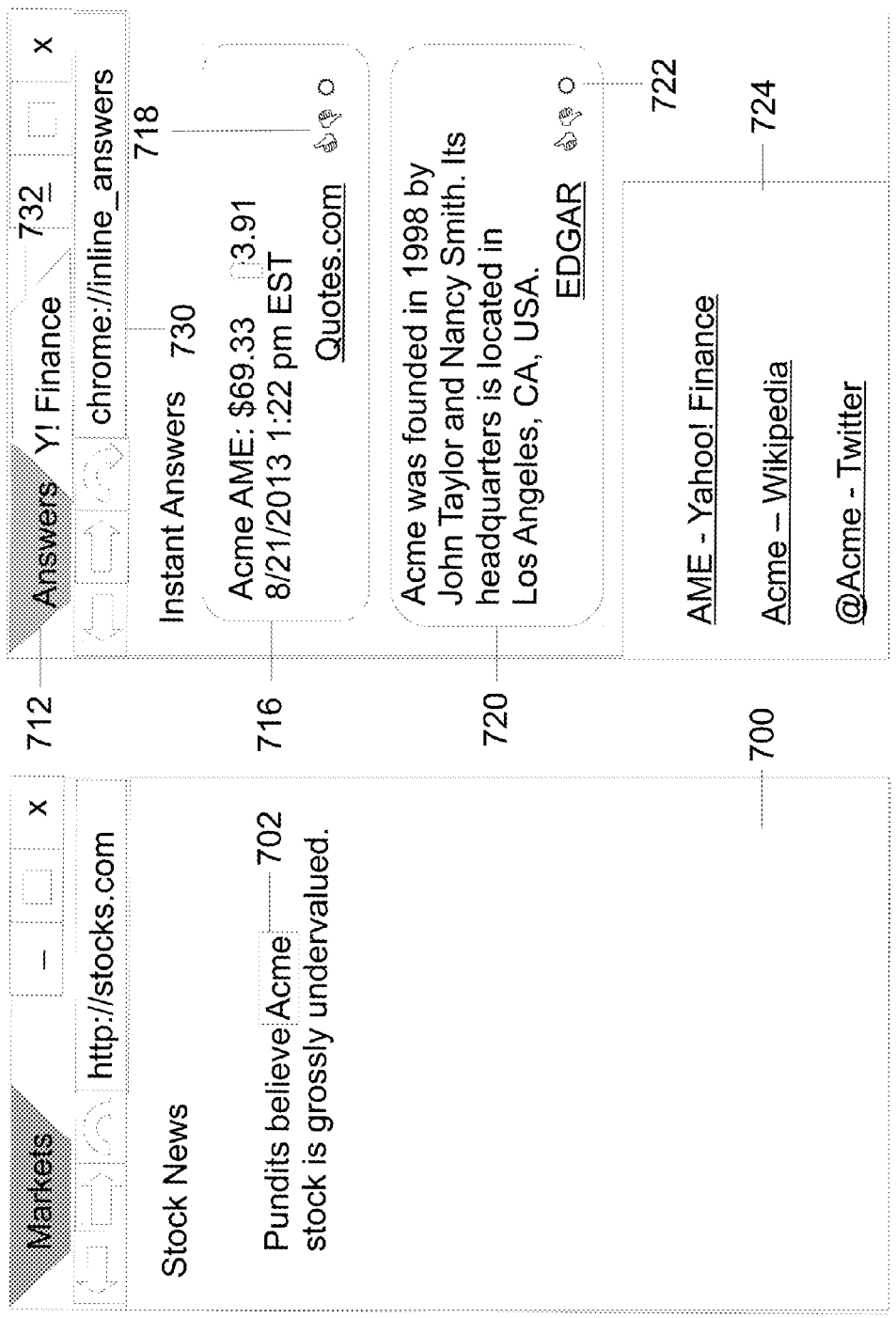
FIG. 12 illustrates a user interface that displays answers computed by the answer engine, in which three inline answer results and two link answer results have been returned by the answer engine, according to one or more embodiments of the invention.

FIG. 12 illustrates a user interface that displays answers computed by the answer engine, in which three inline answer results and two link answer results have been returned by the answer engine, according to one or more embodiments of the invention. FIG. 12 shows an example scenario of a client program implementing process 500. As shown in FIG. 12, the user may view main browser window 700 that may displaying a page that may include news about stocks. In embodiments, the user may select a company name "Acme" 702 on the page using a mouse, finger gestures, or other means, and step 502 is considered complete. At step 504, in one or more embodiment, once the company name is selected, the client program may send the company name as an answer query to the answer engine service, which processes the answer query according to method 300. At step 506, in at least one embodiment, the client program may receive and parse a list of answer results. For example, the list of answer results for this scenario may include two inline answer results, three link answer results, and the first inline answer result may have the highest relevance. At step 508, in one or more embodiment, the client program may either find or open result window 710, shown to the right of the main browser window. At step 510, in at least one embodiment, if there were any existing, un-pinned tabs in result window 710, the client program may close the tabs. At step 512, in embodiment, the client program may open a local page (with location indicated by location bar 730) that may display the inline answer results in containers 716 and 720. If not marked as trusted, the inline answer results may be sanitized to render malicious content harmless. In one or more embodiments, the inline answer results may not be rendered or sanitized until the area that would display the associated content becomes visible.

According to one or more embodiments, each container, such as 716 or 720 may have buttons 718 for the user to indicate whether the result was helpful. Also, each container may have a button 722, which may open a popup, reveal a form, or link to another page which allows the user to view and modify settings for the answer generator that generated the inline answer result. The client program may also display the link answer results in container 724. At step 514, in at least one embodiment, the client program may open browser tab 732, using a local page location. For example, the contents of the local page may ensure that the icon for Yahoo! Finance (not shown here) and the label "Y! Finance" appear in the tab itself (these are retrieved from the first link answer result). When the user clicks tab 732, in one or more embodiments, the client program may cause tab 732 to load content from the first link answer result's answer location. In this scenario, the second answer result's answer location may be a page in the Yahoo! Finance web site, which may show information about a company and its stock price.

In embodiments of the invention, within the answer engine, the response containing answer results may also include suggested answer generators. If this case, the user interface may include in container 724 links to execute each individual recommended answer generator, as well as buttons to add the recommended answer generators to the user's configuration. To execute an individual answer generator, in one or more embodiments, the answer engine may follow process 300, but may only execute the single answer generator in step 312. If inline answer results are produced by the single answer generator, for example, the user interface may add buttons to each result, allowing the user to add the answer generator to his configuration.

In at least one embodiment, the process 500 of displaying search results allows users to quickly view answers without disrupting the user's main browsing activity. After a user discovers the answer to his question, the user may not have to close the windows or tabs that the client program opened in response to the associated answer query. In addition, the user may enter or select an answer query only once to see results from multiple sites immediately. If some answers are in the form of inline content, the user may see them on the same page without additional user interface interaction (such as clicking links). These improvements may automate and simplify the answer search user experience.

Ordering Answer Results

In one or more embodiments, the answer engine may use event-based data mining techniques to order answer results, based in part by a score computed for the answer generator that produced them. In at least one embodiment, the answer engine may penalize or reward an answer generator based on the user action taken and the relevance of the generated answer result. For example, actions that can be captured include: 1) the user opening a tab for the first time; 2) the user closing a tab; 3) the user rearranging the tabs; and 4) the user providing explicit feedback about a tab, possibly by rating it.

As an example, if the Yahoo! answer generator produces an answer result that has a relevance of 0.75, and the user clicks on the URL in the answer result, the answer engine may increase the Yahoo! answer generator's score by 10*0.75, where 10 is the reward for the user following a link produced by an answer generator. If the Yahoo! answer generator produces another answer result that has a relevance of 0.25, and the user reports the answer result is unhelpful, the answer engine may decrease the Yahoo! answer generator's score by 100*0.25, where 100 is the penalty for a user reporting an answer result as unhelpful.

In embodiments of the invention, the answer engine may then use the score of answer generators to order future answer results. By weighting the reward/penalty of an answer generator, in one or more embodiments, by the reported relevance of a produced answer result, the answer engine may allow answer generators to trade-off between having its results shown earlier (normally results with high relevance are displayed earlier) and being ranked highly (if a user explicitly closes a page associated with an answer result, the answer generator that produced it will have its score decreased more if the corresponding answer result had a higher relevance). In one or more embodiments, the answer engine may allow users to select answer generators, and display the ranking of each answer generator, along with the developer's name and usage count.

In embodiments of the invention, the answer engine may adjust the score for any plug-in, by tracing answers back to the plug-ins that were responsible for producing them. Plug-in scores may be computed by exponential filtering such that that more recent activity affects a plug-in's score more than less recent activity. If answer engine service uses exponential filtering to compute scores, in one or more embodiments, whenever the answer engine service is notified of some user activity, the new score is computed as:

$$\text{New score} = (\text{previous score}) * \exp(-\text{lambda} * (\text{time elapsed since previous update})) + (\text{self-reported relevance of answer result}) * (\text{reward or penalty for specific user activity})$$

where "lambda" is a positive number that controls how fast old scores should be forgotten. "Previous score" is the saved score before the current update, which occurred "time elapsed since previous update" time units ago. If the user activity indicates the answer result was helpful, the "reward or penalty for specific user activity" term is positive. If the user activity indicates the answer result is unhelpful, the "reward or penalty for specific user activity" term is negative or zero. The reward or penalty for a specific user activity may vary based on: 1) the identity of the user; or, 2) the time elapsed since the answer associated with activity was generated.

In at least one embodiment, the answer engine may also decrease plug-in scores based on their execution characteristics, in order to incentivize plug-in authors to optimize their plug-ins to take as little time, memory, and bandwidth as possible. According to embodiments of the invention, after a plug-in is executed, its new score is computed as:

$$\text{New score} = (\text{previous score}) * \exp(-\text{lambda} * (\text{time elapsed since previous update})) - (\text{execution penalty per second}) * (\text{execution time in seconds}) - (\text{execution penalty per byte of memory}) * (\text{peak memory usage in bytes}) - (\text{execution penalty per byte of upload bandwidth used}) * (\text{total upload bandwidth used in bytes}) - (\text{execution penalty per byte of download bandwidth used}) * (\text{total download bandwidth used in bytes}).$$

Again, "previous score" is the saved score before the current update, which occurred "time elapsed since previous update" time units ago. "Execution penalty per second" is a non-negative number indicating how much a plug-in score should be penalized for every second of plug-in execution. "Execution time in seconds" is the number of seconds the plug-in took before producing its result. "Execution penalty per byte of memory" is a non-negative number indicating how much a plug-in score should be penalized for every byte of memory used. "Peak memory usage in bytes" indicates the peak amount of memory the plug-in used while executing (or if this number is not available, the highest sampled amount of memory detected). "Execution penalty per byte of upload bandwidth used" is a non-negative number indicating how much a plug-in score should be penalized for each byte the plug-in sends over the network (for example, to request another site for information). "Execution penalty per byte of download bandwidth used" is a non-negative number indicating how much a plug-in score should be penalized for each byte the plug-in receives over the network (for example, to receive the response to a request made to another site).

In one or more embodiments, parameters may also be passed to content recognizers, triggers, and result post-processors via the answer query. In these embodiments, the answer engine service may produce suggestions and documentation on how to complete partial answer queries ending with settings for plug-ins. For example, when the answer query input changes, the client program may send the partial answer query to the answer engine. The answer engine may then respond with a list of answer queries that complete the partial answer query and/or some additional content, which the client program displays outside of the input field, if any. In at least one embodiment, the user may select a more complete answer query or continue to enter more characters. For example, suppose the user has chosen "yf" as the activation code for a Yahoo! Finance answer generator, and "gm" as the activation code for a Google Maps answer generator. Further, suppose that "gd" is the default activation code for a Google Drive answer generator, which has not been explicitly added by the user.

In at least one embodiment, the Google Maps answer generator may take a "zoom" parameter as one of its settings. If the answer query ends with the character "?", for example, the answer engine responds with the same query, with the user's chosen and/or the system default activation codes appended to the query. For example, if the user entered the partial answer query "92016 ?", then the answer engine may suggest the answer queries "92016 ?yf" (labeled with the text Yahoo! Finance), "92016 ?gm" (labeled with the text "Google Maps"), and "92016 ?gd", labeled the text "Google Drive". In one or more embodiments, the answer engine may also execute process 300 with the partial answer query, stripped of the last "?", to determine how to order suggestions. In this example, the answer engine may also execute process 500 with the partial answer query "92016" to determine that the Google Maps answer generator produces a highly relevant answer result (because 92016 is a valid zip code), and as a result, order "92016 ?gm" as the first suggestion.

In one or more embodiments, if a partial answer query ends with "?<s>", where <s> is a string of alphanumeric characters, the answer engine may suggest answer generators that have an activation code that begins with <s>. As such, with the example setup above, if the user has entered "92016 ?g", the answer engine may suggest the answer queries "92016 ?gm" and "92016 ?gd". Again, the answer engine may execute process 300, using "92016" as the answer query after stripping everything after the final "?" and the "?" itself. The result of process 300 may indicate that the Google Maps answer generator produces a highly relevant answer result, and as a result, "92016 ?gm" should be displayed first.

In one or more embodiments, if a partial answer query ends with a valid activation code, followed by a "(" character, which is not terminated by a ")" character, the answer engine may determine which answer generator corresponds to the activation code, and may respond with documentation on how to specify settings to the answer generator. This documentation may be part of the metadata of an answer generator, or may be dynamically generated by the answer generator executing as a plug-in. In at least one embodiment, the answer generator may also specify suggested completions of the partial content, so that parameter names for settings can be auto-completed. In the example setup above, if the user has entered "92016 ?gm(z", the answer engine suggests the (still incomplete) answer query "92016 ?gm(zoom:" and adds documentation on how to use the "zoom" parameter in the settings for the Google Maps plug-in. The client program may allow the user to choose the suggestion and may also display the documentation while the user is still entering the answer query.

In embodiments of the invention, answer results may also be returned in response to partial answer queries, which may be displayed by the client program. In at least one embodiment, passing parameters to plug-ins may give users more control of their answer results, without requiring the answer engine itself to understand them. Documentation and suggestions returned while entering a search query may help users to learn how to activate and customize plug-ins without requiring users to read separate documentation.

System Advantages

According to several embodiments of the invention, users may select which plug-ins to execute and create their own plug-ins to recognize content, generate answers, and post-process answers. As such, the answer engine is more customizable than the prior art. Since content recognition may be implemented as regular expressions or programs, keywords in the answer query are not necessary for the answer engine to operate effectively. Also, since not all content recognizers in the system may execute, and content recognition results may be utilized by multiple answer generators, the answer engine may reduce the time needed to implement content recognition compared to other systems. Furthermore, since content recognizers may be authored by different users than answer generators, authors of answer generators do not need to implement recognition algorithms even though their answer generators depend on them. Also, since the answer generation process may ensure that plug-ins execute in a sandboxed environment, and that any inline content may be sanitized before the client displays it, plug-ins may be added to the system at any time and become available immediately.

According to embodiments of the invention, since answer generators may return answer locations that may never have to be reachable by the answer engine (or may not have been fetched ever before), the answer engine may return results from the deep web. Furthermore, in at least one embodiment, since fetched documents (or metadata about fetched documents) or canned answers may not be required by the answer engine, the system may require much less space compared to a traditional search engine or answer engine, and may not require the use of a web crawler.

In at least one embodiment of the invention, content providers have the capability to direct users to their sites in the following methods: 1) by uploading plug-ins; 2) by uploading to the recognition index 216, and 3) by uploading to the term/recognition key index 218. As such, in one or more embodiments, content providers may have more control of what pages and/or content is given to users, such that content providers may not have to use search engine optimization to have their content shown by the answer engine.

Conclusion

Accordingly, one skilled in the art will recognize wherein at least one embodiment of the answer engine may enable answer engine users the capability to customize the operation of an answer engine, including using plug-ins defined by other users, may enable an answer engine to be implemented by a developer community instead of a monolithic entity, may enable an answer generation process to occur without keywords or a pre-defined grammar and may enable content providers to leverage content recognition capabilities in other plug-ins. In addition, embodiments of the invention may reduce the computation required for content recognition based on the user's preferences, may enable new answer generation methods to come online (and therefore changing the behavior of the answer engine) without server restarts, manual approval, or significant security risks, may enable answer engines to return results from the deep web, including results in private networks and results generated with knowledge of the user's identity and may reduce the storage space required for an answer engine. Furthermore, one or more embodiments of the invention may eliminate the need for a web crawler, may allow content providers to control when users are directed to their sites by the answer engine, and may enable users to view multiple search results without leaving the currently viewed window by selecting or inputting text. By way of one or more embodiments, the invention may enable users to view multiple search results without loading each search result immediately, may streamline the process for users to search for multiple items in a succession, and may rank plug-ins and their generated answer results based on user interaction with a browser.

While the invention herein disclosed has been described by means of specific embodiments and applications thereof, numerous modifications and variations could be made thereto by those skilled in the art without departing from the scope of the invention set forth in the claims.

What is claimed is:

1. A method of computing answer results to queries submitted by a user comprising:
   providing a plug-in executor comprising at least one plug-in created by a plug-in developer;
      wherein said one or more plug-ins are configured to execute one or more of system-defined programs and plug-in developer-defined programs, and
      wherein said plug-in executor is configured to one or more of execute arbitrary program text uploaded by said plug-in developer or execute routines parameterized by said plug-in developer;
   providing a user database configured to store and retrieve user preferences;
   providing a plug-in database configured to store and retrieve plug-in specifications;
   providing a content recognizer set determinator configured to compute a subset of all available content recognizers, wherein said computation of said subset depends on one or more of contents of a query submitted by said user,
   providing an answer generator set determinator configured to compute a subset of all available answer generators, wherein said compute of said subset depends on one or more of contents of said one or more queries submitted by said user and a dictionary of combined recognition results used as an input; and,
   providing a controller configured to
      receive a query from a client program,
      lookup said user's preferences in said user database,
      determine the subset of content recognizers to execute using said content recognizer set determinator, and lookup specifications for each content recognizer in said subset of content recognizers,
      submit said specifications for each content recognizer to said plug-in executor, using said query and said user's preferences as input, and combine all content recognition results into a dictionary of combined content recognition results,
      determine the subset of answer generators to execute using said answer generator set determinator, and lookup the specifications for each answer generator in said subset of answer generators, to yield a set of answer generator specifications,
      submit said set of answer generators specifications to said plug-in executor, using said query, said user's preferences, and said dictionary of recognition results as input, and combine the answer results from each answer generator into a list of answer results, and
      respond to said client program with said list of answer results, such that
         said user is able to customize how an answer engine responds to queries,
         answers are generated by at least one answer generator plug-in created by one or more plug-in developers,
         content recognizers are implemented by at least one content recognizer plug-in created by one or more other plug-in developers, and
         answer generators utilize content recognizers even if said content recognizers are not created by a single plug-in developer, and content recognition execution resources are bounded.

2. The method of claim 1, wherein said content recognizers are further configured to execute a plug-in developer-specified regular expression on said answer query using a regular expression engine, and if said regular expression matches a portion of said answer query, to output a recognition result with the matched groups of said regular expression as auxiliary data.

3. The method of claim 2, wherein said regular expression engine is modified to limit the number of backtracking attempts before reporting a negative match, such that the execution of said regular expression is bounded.

4. The method of claim 1, wherein said answer generators are further configured to generate answer locations using a URL template, which may have parameters that are substituted by data in said queries, said dictionary of combined content recognition results, or said user preferences.

5. The method of claim 1, wherein the content recognizer set determinator is further configured to
   build the set of content recognizers by looking up in said user database a list of trigger-answer generator associations selected by said user initiating said query; and, combining all referenced content recognizers referenced by a trigger in said list of trigger-answer generator associations.

6. The method of claim 1, further comprising providing an index of recognition keys mapped to content recognizers configured to lookup content recognizers that output a given recognition key, and wherein the content recognizer set determinator is further configured to
   look up in said user database a list of answer generators selected by the user initiating the query;
   build a set of recognition keys by combining all recognition keys referenced by said answer generator in said list of answer generators, into a set;
   build the set of content recognizers by looking up each recognition key in said set of recognition keys in said index of recognition keys mapped to content recognizers; and,
   combine one or more found content recognizers into a set.

7. The method of claim 1, further comprising providing a term index configured to look up and store answer generator references associated with terms, and wherein the content recognizer set determinator is further configured to
   perform transformations on said term dictionary by one or more of correcting spelling mistakes, adding synonyms, adding translations, stemming words, removing stop words, expanding acronyms, or any combination thereof;
   lookup in said term index, using the transformed terms, to yield a set of answer generators; and, build the set of content recognizers by combining all content recognizers referenced by an answer generator in said set of answer generators.

8. The method of claim 1, wherein the answer generator set determinator is further configured to
    look up in said user database a list of trigger-answer generator associations selected by said user;
    look up trigger specification in said plug-in database, for each trigger referenced by said list of trigger-answer generator associations, to yield a set of trigger specifications;
    submit said set of trigger specifications to said plug-in executor, using said dictionary of combined recognition results as input, to determine which triggers are activated; and,
    build the set of answer generators to activate by selecting one or more answer generators in said list of trigger-answer generator associations, that have their associated triggers activated.

9. The method of claim 1, wherein said plug-in executor is further configured to execute programs in a sandboxed environment in order to limit computation resources, memory, system resource access, or network access utilized by said programs.

10. The method of claim 9, wherein the programs comprises scripts and wherein said plug-in executor is further configured to execute the programs in an interpreter.

11. The method of claim 9, wherein said plug-in executor is further configured to
    monitor said computation resources, said memory, and bandwidth used by one or more of said at least one plug-in created by said plug-in developer, wherein said bandwidth comprises upload bandwidth and download bandwidth, and
    adjust a score for said at least one plug-in by penalizing for said computation resources, said memory, said upload bandwidth, and said download bandwidth used by said at least one plug-in.

12. The method of claim 1, wherein said answer engine is configured to use a report by adjusting the score of one or more of said at least one plug-in created by said plug-in developer, by a value dependent on both a type of user interface activity and a relevance score reported by one or more of said at least one plug-in, wherein said user interface activity is configured to better order and rank one or more plug-ins, wherein answer results and one or more plug-ins trade-off between accuracy and wherein said answer results are shown to said user or one or more other users more prominently.

13. The method of claim 12, wherein said at least one plug-in is an answer generator.

14. The method of claim 12, wherein said at least one plug-in is a content recognizer.

15. The method of claim 1, wherein said controller is further configured to sanitize said list of answer results such that the content in said list of answers, when inserted into a user interface, is not able to perform malicious operations, wherein said malicious operations include sending private information to one or more external sites.

16. The method of claim 1, further comprising providing a plug-in developer and system populated index from keywords to specifications for recognition results, wherein said controller is further configured to search said index from keywords to specifications for recognition results, using said query as input, to produce additional recognition results by processing said specifications for recognition results.

17. The method of claim 1, further comprising providing a knowledge base of facts configured to look up facts for a given query term, wherein said controller is further configured to search said knowledge base using said query term as input, to produce additional recognition results.

18. The method of claim 1, further comprising providing a term/recognition key index configured to look up and store answer generator references associated with terms and recognition keys, and wherein said answer generator set determinator is further configured to:
    transform terms in an answer query by one or more of correcting spelling mistakes, adding synonyms, adding translations, stemming words, removing stop words, expanding acronyms, or any combination thereof; and,
    lookup in said term/recognition key index, using the transformed terms and the recognition keys output by said set of content recognizers as said input, to yield a partial set of answer generators included in the final set of answer generators output by said answer generator set determinator.

19. The method of claim 1, further comprising providing a plug-in developer populated generic database configured to store and retrieve data accepted from said plug-in developer, wherein said plug-in executor is further configured to provide a plug-in access to query said generic database during execution of said plug-in.

20. The method of claim 1, wherein said at least one plug-in created by said plug-in developer, provide documentation on how to use said one or more plug-ins given a partial query, and wherein said user is shown instructions on how to use said at least one plug-in created by said plug-in developer while typing an answer query.

21. A method of displaying a list of answer results in response to user-submitted queries comprising:
    providing an answer engine configured to respond to user-submitted queries with a list of answer results;
    providing an answer displayer comprising a browser plug-in, a customized browser, an application, or any combination thereof, wherein said answer display is configured to use browser components to
    receive an answer query as input from a user,
    send said answer query to said answer engine,
    receive and parse answer results returned by said answer engine,
    find an existing display area or open a new display area in a user interface to display said answer results,
    remove one or more user interface element showing an answer result from a previous query, in said display area,
        unless the removal of the one or more user interface elements would cause the display area to be closed by said answer displayer, or
        unless said user has indicated to keep the one or more user interface elements,
    compute a first group of answer results by selecting one link answer result, or one or more inline answer results from said answer results,
    display said first group of answer results in said display area,
    compute the remaining groups of answer results by selecting one link answer result, or one or more inline answer results from said answer results, until no more ungrouped answer results remain, and
    display in said display area one or more remaining groups from said remaining groups by directly displaying answer results if said one or more remaining groups consists only of inline answer results, or by displaying a button if said one or more remaining groups consists of a link answer result, such that a linked answer location is loaded and displayed when said user selects said button;

wherein the answer displayer shows answer results to said user without requiring said user to manually open or close display areas or to remove user interface elements showing results of previous queries, wherein the answer displayer shows a plurality of results to said user from different sources without requiring the user to submit said query to multiple user interfaces, wherein links to answer locations are not fetched until the user selects the links, and wherein the answer displayer shows inline answer results to said user without additional user interaction.

22. The method of claim 21, wherein said answer displayer is further configured to detect when said user selects, closes, or rearranges each user interface element of said one or more user interface elements representing said one or more answer results, and send a report of user interface activity to said answer engine.

23. A system configured to compute answer results to queries submitted by a user comprising:

a plug-in executor comprising at least one plug-in created by a plug-in developer,
wherein said one or more plug-ins are configured to execute one or more of system-defined programs and plug-in developer-defined programs, and
wherein said plug-in executor is configured to one or more of execute arbitrary program text uploaded by said plug-in developer or execute routines parameterized by said plug-in developer;

a user database configured to store and retrieve user preferences;

a plug-in database configured to store and retrieve plug-in specifications;

a content recognizer set determinator configured to compute a subset of all available content recognizers,
wherein said compute of said subset depends on one or more of contents of a query submitted by said user, an answer generator set determinator configured to compute a subset of all available answer generators,
wherein said computation of said subset depends on one or more of contents of said one or more queries submitted by said user and a dictionary of combined recognition results used as an input; and, a controller configured to
receive a query from a client program,
lookup said user's preferences in said user database,
determine the subset of content recognizers to execute using said content recognizer set determinator, and lookup specifications for each content recognizer in said subset of content recognizers,
submit said specifications for each content recognizer to said plug-in executor, using said query and said user's preferences as input, and combine all content recognition results into a dictionary of combined content recognition results,
determine the subset of answer generators to execute using said answer generator set determinator, and lookup the specifications for each answer generator in said subset of answer generators, to yield a set of answer generator specifications,
submit said set of answer generators specifications to said plug-in executor, using said user's preferences and said dictionary of recognition results as input, and
combine the answer results from each answer generator into a list of answer results, and
respond to said client program with said list of answer results, such that
said user is able to customize how an answer engine responds to queries,
answers are generated by at least one answer generator plug-in created by one or more plug-in developers,
content recognizers are implemented by at least one content recognizer plug-in created by one or more other plug-in developer, and
answer generators utilize content recognizers even if said content recognizers are not created by a single plug-in developer, and content recognition execution resources are bounded.

24. A system configured to compute answer results to queries submitted by a user comprising:

an answer engine configured to respond to user-submitted queries with a list of answer results;

an answer displayer comprising a browser plug-in, a customized browser, an application, or any combination thereof, wherein said answer display is configured to use browser components to
receive an answer query as input from a user,
send said answer query to said answer engine,
receive and parse answer results returned by said answer engine,
find an existing display area or open a new display area in a user interface to display said answer results,
remove one or more user interface element showing an answer result from a previous query, in said display area,
unless the removal of the one or more user interface elements would cause the display area to be closed by said answer displayer, or
unless said user has indicated to keep the one or more user interface elements,
compute a first group of answer results by selecting one link answer result, or one or more inline answer results from said answer results,
display said first group of answer results in said display area,
compute the remaining groups of answer results by selecting one link answer result, or one or more inline answer results from said answer results, until no more ungrouped answer results remain, and
display in said display area one or more remaining groups from said remaining groups by directly displaying answer results if said one or more remaining groups consists only of inline answer results, or by displaying a button if said one or more remaining groups consists of a link answer result, such that a linked answer location is loaded and displayed when said user selects said button;

wherein the answer displayer shows answer results to said user without requiring said user to manually open or close display areas or to remove user interface elements showing results of previous queries, wherein the answer displayer shows a plurality of results to said user from different sources without requiring the user to submit said query to multiple user interfaces, wherein links to answer locations are not fetched until the user selects the links, and wherein the answer displayer shows inline answer results to said user without additional user interaction.

* * * * *